(12) United States Patent
Ambühl et al.

(10) Patent No.: US 10,289,079 B2
(45) Date of Patent: May 14, 2019

(54) MANAGEMENT SYSTEM USING FUNCTION ABSTRACTION FOR OUTPUT GENERATION

(75) Inventors: Stefan Ambühl, Meilen (CH); Felix Brunner, Zürich (CH); Andreas Hennig, Unterägeri (CH); Edgar Vis, Baar (CH); Hanspeter Grossele, Cham (CH); Renato Colcerasa, Milan (IT); Michael J. Schmickley, Algonquin, IL (US)

(73) Assignee: Siemens Schweiz AG, Zürich (CH)

( * ) Notice: Subject to any disclaimer, the term of this patent is extended or adjusted under 35 U.S.C. 154(b) by 558 days.

(21) Appl. No.: 13/609,364

(22) Filed: Sep. 11, 2012

(65) Prior Publication Data

US 2013/0086497 A1 Apr. 4, 2013

Related U.S. Application Data

(60) Provisional application No. 61/541,925, filed on Sep. 30, 2011.

(51) Int. Cl.
*G05B 15/02* (2006.01)
*G06F 9/451* (2018.01)

(52) U.S. Cl.
CPC ...... *G05B 15/02* (2013.01); *G05B 2219/2642* (2013.01); *G06F 9/451* (2018.02)

(58) Field of Classification Search
CPC ... H04L 12/24; H04L 14/022; H04L 14/0226; H04L 14/0253; G06F 11/324; G05B 23/0267; G05B 23/02

USPC .................................................. 715/700–866
See application file for complete search history.

(56) References Cited

U.S. PATENT DOCUMENTS

| | | | |
|---|---|---|---|
| 6,487,457 B1 * | 11/2002 | Hull et al. ....................... 700/17 |
| 2004/0210348 A1 * | 10/2004 | Imhof et al. .................. 700/275 |
| 2009/0065596 A1 * | 3/2009 | Seem ....................... F24F 11/30 236/51 |
| 2009/0210071 A1 * | 8/2009 | Agrusa et al. ..................... 700/9 |
| 2010/0031177 A1 * | 2/2010 | Reed .................... G05B 19/042 715/771 |
| 2011/0153089 A1 * | 6/2011 | Tiemann .............. G05B 19/056 700/276 |
| 2011/0175701 A1 * | 7/2011 | Kobayashi ............. G05B 15/02 340/3.7 |
| 2013/0086497 A1 * | 4/2013 | Ambuhl ................ G05B 15/02 715/762 |

(Continued)

*Primary Examiner* — Ryan F Pitaro

(57) ABSTRACT

An arrangement includes a memory, a display, a user input device, and a processing circuit. The memory stores programming instructions and data values corresponding to a first object data record having a first format and a second object data record having a second format. The first record corresponds to a first BAS device, and the second record corresponds to a second BAS device. The processing circuit receives additional data values from BAS devices and stores the additional data values in the memory. The processing device retrieves a data value corresponding to the first record from the memory. The processing device stores an object type definition having a third format, and maps the data value corresponding to the first record to the third format. The processing circuit provides the requested data based on the mapped data value to a software operation for generating a display.

31 Claims, 28 Drawing Sheets

(56) References Cited

U.S. PATENT DOCUMENTS

| | | | |
|---|---|---|---|
| 2014/0244047 A1* | 8/2014 | Oh | G08B 19/00 |
| | | | 700/278 |
| 2015/0256401 A1* | 9/2015 | Zinger | H04L 41/14 |
| | | | 370/401 |
| 2018/0267701 A1* | 9/2018 | Rigg | G06F 3/04847 |

* cited by examiner

RELATIONSHIP FINDER
OUTPUT FILE

TEMP_SP_03: SCH. 1; SCH. 3

TEMP_SP_08: SCH. 1

CHILL_PWR: SCH. 2; SCH. 4

*FIG. 14*

MANAGEMENT SYSTEM USING FUNCTION ABSTRACTION FOR OUTPUT GENERATION

This application claims the benefit of U.S. Provisional Application Ser. No. 61/541,925, filed Sep. 30, 2011, which is incorporated herein by reference.

FIELD OF THE INVENTION

The present invention relates to building automation systems, and more particularly, to user interfaces for building automation systems that allow for monitoring and control of building automation system devices.

BACKGROUND OF THE INVENTION

Building automation systems encompass a wide variety of systems that aid in the monitoring and control of various aspects of building operation. Building automation systems include security systems (including access control systems and/or CCTV systems), fire or life safety systems, lighting systems, and comfort systems, sometimes referred to as heating, ventilation, and air conditioning ("HVAC") systems. In large commercial and industrial facilities, such systems have an extensive number of elements and are highly automated.

The elements of building automation systems are widely dispersed throughout a facility. For example, a comfort or HVAC system typically includes large numbers of temperature sensors and ventilation damper controls, as well as other elements, which are located in virtually every area of a facility. Similarly, a security system may have intrusion detection, motion sensors and alarm actuators dispersed throughout an entire building or campus. Fire safety systems also include widely dispersed devices in the form of smoke alarms, pull stations and controllers. To achieve efficient and effective building automation system operation, there is a need to monitor the operation of, and often communicate with, the various dispersed elements of a building automation system.

To this end, building automation systems typically have one or more centralized control stations in which data from the system may be monitored, and in which various aspects of system operation may be controlled and/or monitored. The control station typically includes a computer having processing equipment, data storage equipment, and a user interface. To allow for monitoring and control of the dispersed control system elements, building control systems often employ multi-level communication networks to communicate operational and/or alarm information between operating elements, such as sensors and actuators, and the centralized control station.

In older systems, control stations provided building control data in a cumbersome, text-oriented format. The control station presented data in a way that typically required intimate system knowledge to interpret and understand. As building automation systems become more complex, it has become increasingly advantageous to present building system data in a more intuitive manner. To address this issue, control stations of building automation systems now generally employ graphical user interfaces that combine text information with representative graphics to illustrate the context of the system data being displayed. Graphics can include graphically displayed maps, floor plans, diagrams of complex equipment, and even graphic display of controlled or sensed values.

An example of the use of representative graphics may be the use of a thermometer shaped graphic to represent a temperature reading, as opposed to a simple text value. Similarly, the alarm status for a floor of building may be represented on a graphical display of the building floor plan, as opposed to a simple text list of alarm locations.

While the use of graphics and other advanced interface features have enhanced access and monitoring of building system data, one limitation on control stations is the manner in which information regarding different devices and subsystems is acquired. Because building systems can involve products from a wide variety of manufacturers, it can be cumbersome for various output-generating operations to acquire data from the various products and subsystems. Such output-generating operations can include those that provide graphical user interfaces to system data, reporting, commanding, alarming and data logging. Such operations must account for the fact that different manufacturers may present different formats of device output data.

For example, one temperature sensor may provide status data as a single value between 0 and 14, and another temperature sensor may provide status data as multiple binary values representative of degrees Celsius. In such a case, an output generating operation would need separate ways of handling the two sensor data formats. A drawback of this arrangement is that every new operation or application must account for different presentations of data from various devices.

There is a need, therefore, for a more intuitive interface that allows for a more uniform access to data of devices and subsystems in building automation systems by output-generating operations that does not require specific programming for every different brand or style of building automation system device.

SUMMARY OF THE INVENTION

At least some embodiments of the present invention address the above-need as well as others, by providing generic functions for various common elements and subsystems of building automation devices that may be accessed by output-generating operations, and mapping elements that map data from individual device data to the generic function definition.

A first embodiment is an arrangement for use in a building automation system that includes a memory, a display, a user input device, and a processing circuit. The memory stores programming instructions and a plurality of data values including data values corresponding to each of a first object data record having a first format and second object data record having a second format different from the first format. The first object data record corresponds to a first building automation system (BAS) device, and the second object data record corresponds to a second BAS device. The processing circuit is operably coupled to the memory and the display, and is configured to receive additional data values from one or more BAS devices via a network and store the additional data values in the memory. The processing device is further configured to request data pertaining to the first object data record and retrieve at least one data value corresponding to the first object data record from the memory. The processing device is also configure to store an object type definition that defines a third format, and map the at least one data value corresponding to the first object data record to the third format. The processing circuit is also configured to provide the requested data based on the mapped at least one data value to the software operation, and to execute the software operation to generate at least a portion of a display.

The above described features and embodiments, as well as others, will become more readily apparent to those of ordinary skill in the art by reference to the following detailed description and accompanying drawings.

BRIEF DESCRIPTION OF THE DRAWINGS

FIG. 14 illustrates a representative diagram of an exemplary output file generated by the process of FIG. 13;

DETAILED DESCRIPTION

Figure 1:
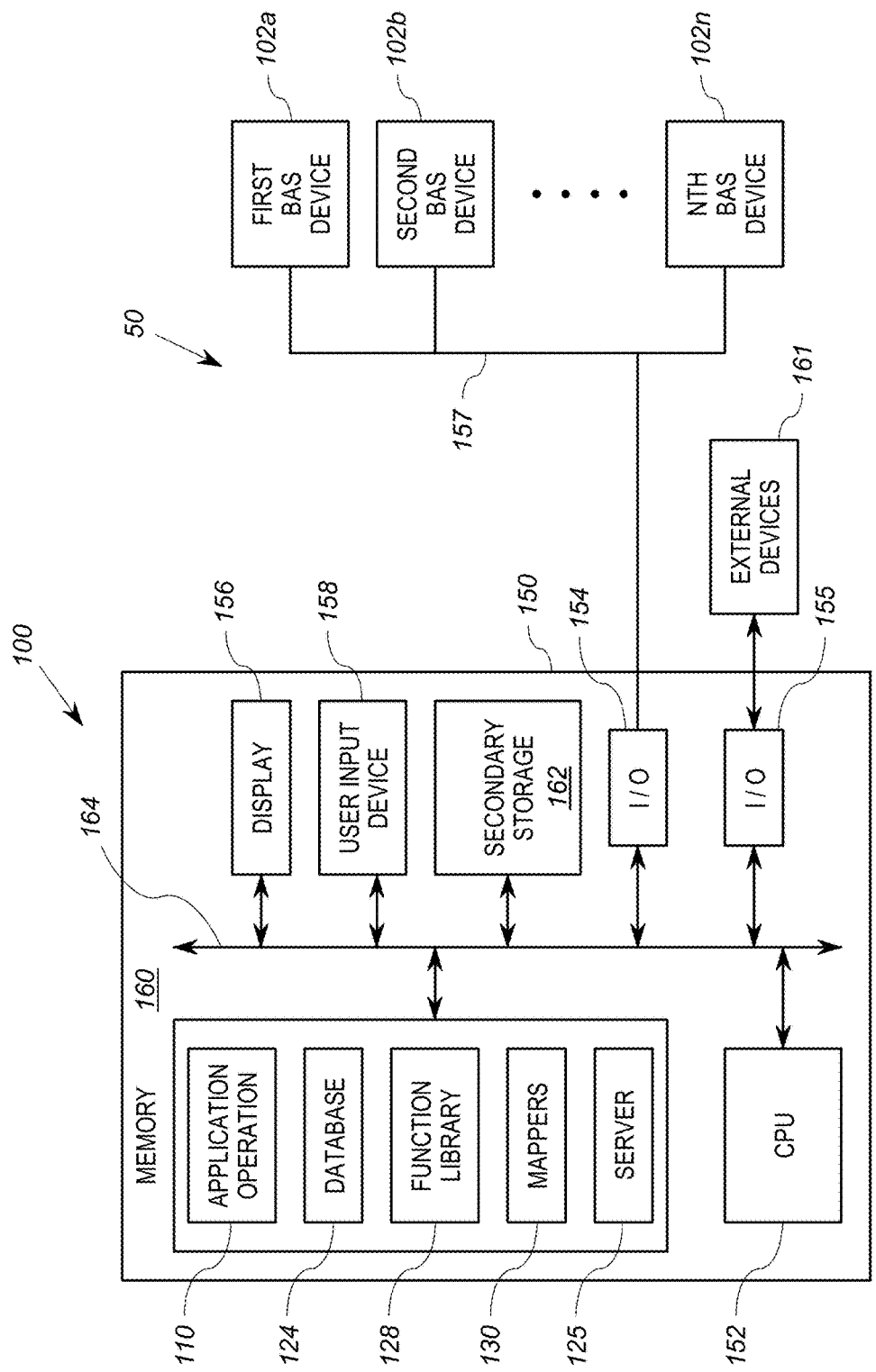
FIG. 1 is a functional block diagram of a management system employed in a building automation system in accordance with a first embodiment of the invention.

FIG. 1 illustrates functional blocks of a first embodiment of a management system 100 implemented in connection with one or more building automation systems, collectively referred to as the building system 50. The system 50 includes a plurality of building automation system ("BAS") devices or subsystems 102a, 102b . . . 102n. The BAS devices/subsystems 102a, 102b . . . 102n may suitably be comfort (HVAC) system devices or subsystems, such as controllers, sensors, actuators, room control subsystems, air handling unit subsystems. Alternatively, or in addition, the BAS devices 102a, 102b . . . 102n may include life safety system devices or subsystems, security or devices or subsystems, lighting system devices, or other building system devices or subsystems.

As discussed above, the management system 100 and BAS devices 102a, 102b . . . 102n form a comprehensive building system 50. The management system 100 and BAS devices 102a, 102b . . . 102n are operably connected to communicate via one or more data networks 157. The data networks 157 may comprise any convention data communication network or combination of networks employed in building automation systems, such as Ethernet networks, ring networks or combinations thereof, and may include other networks such as the Internet. The management system 100 and network(s) 157 allow for management, monitoring and control of the BAS system devices 102a, 102b . . . 102n from a single point.

As shown in FIG. 1, the management system 100 may be implemented in a commercially available general purpose computer 150 specifically configured as described herein. In this embodiment, the management system 100 includes a central processing unit and associated support circuitry (CPU) 152, at least first and second network input/output (I/O) units 154, 155, a display 156, a user input device 158, a primary memory 160, a secondary storage device 162, and a system bus 164. The CPU 152 is configured to execute programming instructions stored in the memory 160 to carryout various operations as described herein. In accordance with such instruction, the CPU 152 is configured to receive data inputs from the user input 158, generate display screens to be displayed on the display 156. The CPU 152 is also configured to communicate with external devices, such as the BAS devices 102a, 102b . . . 102n, via at least the first network I/O unit 154 and the network(s) 157. The CPU 152 is further configured to communicate output files to an external device 161 such as another computer, printer or data store, over one or more networks, via the second network I/O unit 155. To facilitate the above-described functionality, as well as other functionality, the CPU 152 is operably connected in a conventional manner to each of network I/O units 154, 155, the display 156, the user input 158, the primary memory 160, and the secondary storage 162 via the system bus 164.

In this embodiment, the primary memory 160 stores programming instructions for a BAS application operation 110, a BAS database 124, a database server 125, a function library 128, and a function mapper 130. To this end, the primary memory 160 may include volatile memory such as random access memory, as well as other types of readable and writeable memory.

The BAS operation 110 is one or more software programs that interfaces to system data (in the database 124) to facilitate some aspect of managing, monitoring and controlling one or more of the BAS devices 102a, 102b . . . 102n. For example, the operation 110 may suitably be a graphic element generator that generates on the display 156 graphical representation of system objects and values associated with system objects. The operation 110 may further include or comprise command software that allows an application or user to generate command values for the devices 102a, 102b . . . 102n. Another example of the operation 110 is reporting software that can be used to generate reports of trends of values generated within the system 50.

Figure 1A:
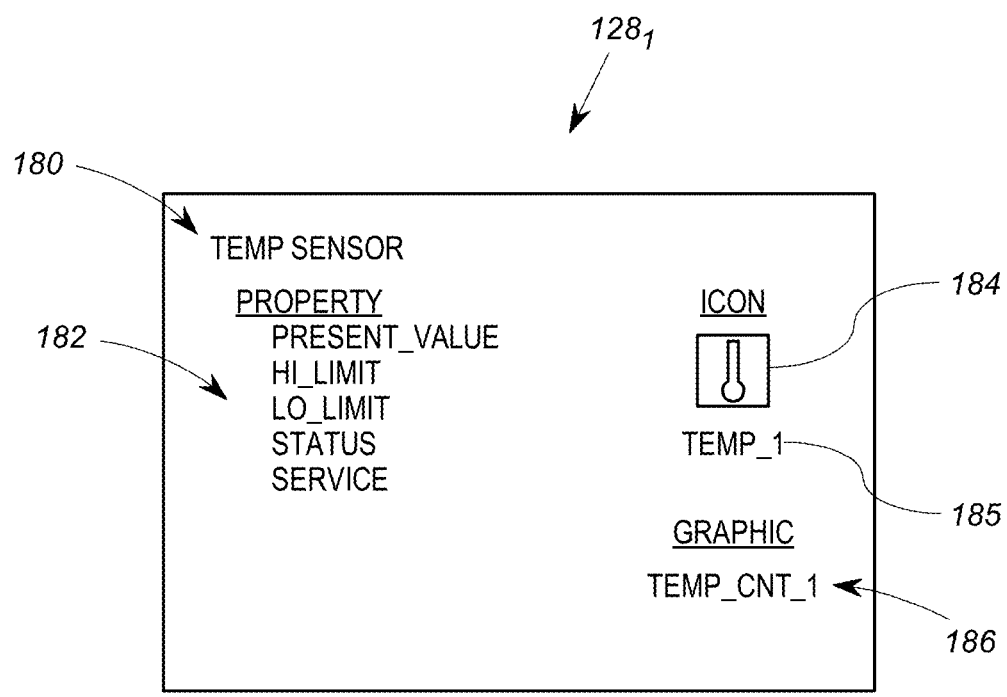
FIG. 1A shows a representative block diagram of an exemplary function definition employed by the management system of FIG. 1.

The function library 128 includes a plurality of function definitions for BAS elements such as devices, assemblies, subsystems, and the like. Each function 128x of the function library 128 is a data file, such an object data record, that provides a definition of common property-types and even common properties and other settings for a group of related objects. For example, as shown in FIG. 1A, a function data file $128_1$ can include a name or identifier 180, a list of properties 182 for a temperature sensor that defines a uniform format, an icon 184 and identifier 185 used for temperature sensors, and a reference to a graphic definition 186 that can be used to display a default graphic of a temperature sensor.

Thus, even though a system may have thousands of temperature sensors, and even though some sensors may have analog outputs of one or more types, and other sensors may have digital outputs of one or more types, the function data file $128_1$ provides common variable properties 182 available from each, such as present_value, high_limit, low_limit, status, and service, as well as common static properties available from each, such as the icon 184/185, and even the default graphic element 186. It will be appreciated that CPU 152 may also execute instructions that configure (add, or edit) functions to change the elements shown in the definition of FIG. 1A Referring again generally to the function library 128, each function therefore defines a predetermined set of output values for a corresponding BAS element type. For example, a function definition for a temperature sensor (see, e.g. FIG. 1A, 2A) may identify a format for output data that includes measured temperature, fault status, active status, high limit, and low limit. A function definition for a pump (see, e.g. FIG. 1B, 2B) may identify a format to identify output values representative of input pressure value, output pressure value, fault status, active status, etc. Each function definition is configured to be employed by a processing unit executing corresponding software to provide generic output values based on the object type associated with the function.

Thus, for example, the CPU 152, in executing the BAS operation 110, can access data related to a particular system object (e.g. one of the devices 102a, 102b . . . 102n) through a generic function corresponding to the object type. In this manner, various objects (or values from objects) of different manufactures, models or configurations, but of the same type, may have a uniform way to present a data interface. Moreover, various objects of the same type may employ the same "icon" in displays, and utilize the same "graphic control" (i.e. graphic display configuration) without specifying such an icon or graphic control in the properties of each individual object.

Figure 4:
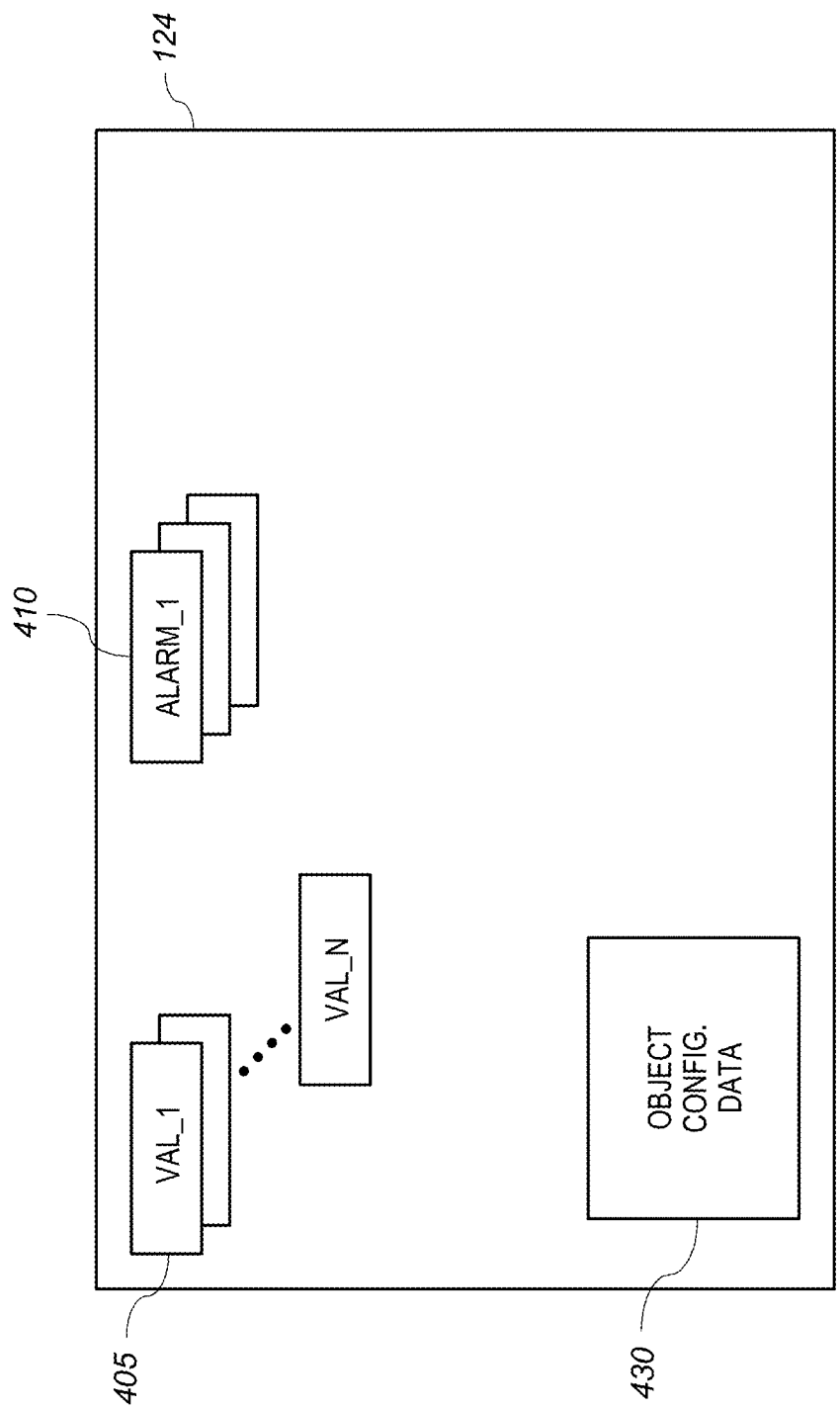
FIG. 4 shows a representative diagram of contents of a database of the building automation system of FIG. 1.

The database 124 is a database containing active system values and data, as well as configuration data for the elements of the system, including configuration data for the BAS devices 102a, 102b . . . 102n and/or data "points" corresponding to such devices. FIG. 4 shows a representative diagram of contents of the database 124. For example, the database 124 includes present (or latest) values 405 for the various points of the system 50, including values (e.g. temperatures, set points, fan speed, etc.) of the devices 102a, 102b . . . 102n. The database 124 also includes alarms or notifications 410 and their corresponding statuses. The database 124 further includes object configuration data 430.

Object configuration data 430 includes an object data record or instance for each object of the system. In particular, the building automation system as described herein comprises a set of objects. Objects may include, among other things, process values (i.e. outputs or inputs of a controller, sensor, valve, camera or the like), or nodes representative of groups of values, such as in a hierarchical definition. For example, a room object may have a temperature sensor output object, an air flow output object, or the like. A pump object may define a command value for the pump, a measured flow value for the pump, and other values. In general, each object data record is a data file or other grouping or arrangement of data that includes identification values for an object, and references to measurement values related to the object. Object data records may further include references to other objects related to the object. The objects of the system 50 also include devices, subsystems, as well as rooms, floors or buildings of the system 50. Each of such objects has its own object data record in the database 124.

Figure 4A:
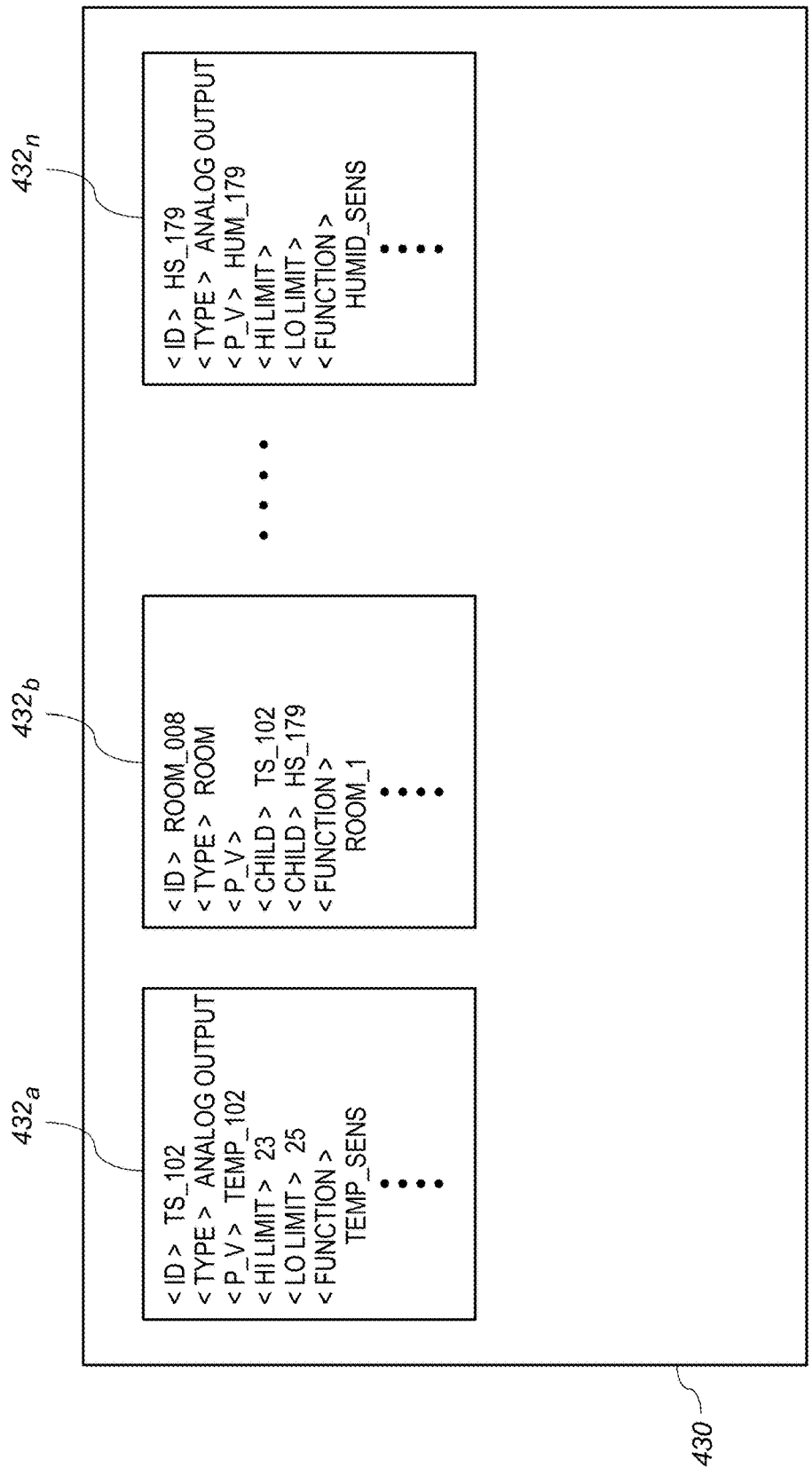
FIG. 4A shows a representative diagram of object configuration data of the database of FIG. 4.

FIG. 4A shows in further detail a representative diagram of the object configuration data 430 as including a set of object data records 432a, 432b . . . 432n associated with each of the BAS devices 102a, 102b . . . 102n in the system 50. Each object data record 432a, 432b . . . 432n includes a set of predetermined properties associated with the respective BAS device 102a, 102b . . . 102n, or a measured value generated by the device. Such properties include unique identifying information <ID> and an object type <TYPE>. Several objects may be of the same object type. For example, an object type may be "analog output", "analog input", "sensor", "controller", "floor", "room", etc. The number and type of properties of each object data record 432a, 432b . . . 432n depends on the object type.

Each object data record 432a, 432b . . . 432n may also reference present value properties <P_V> identifying a present point value corresponding to the object within the database 124. As is known in the art, present values are used to describe operating values of the system for a specific output, input, or the like, such as temperatures at particular sensors, set points for various actuators or air handling units. It will be appreciated, however, that devices of different manufacture may generate different formats of present_values. The object data record 432a, 432b . . . 432n therefore may contain or reference data in a format or style specific to the object itself, and not generally applicable to all objects having essentially the same function. For example, the object data record for two different temperature sensor outputs may include different properties, and may reference data within the database that have different formats.

It will be appreciated that certain objects are merely nodes that contain other objects, such as in a defined hierarchy for the system 50. Such objects may not have, in a direct sense, a present_value property. For example, the object data record 432b corresponds to a "room" object. A "room" object in this embodiment is a construct representative of a physical space in the building, and not an active variable (i.e. process output or input) itself. In this embodiment, the room object data record 432b has properties identifying child objects, such as a temperature sensor output object TS_102 and a humidity sensor output object HS_179, which would represent the measured temperature in the room, and the measured humidity in the room.

Moreover, it will be appreciated that many or most object data records 432a, 432b, and 432n also contain configuration properties, such as high limits and low limits (for data point objects), as well as properties identifying hierarchical relationships to other objects. In the embodiment described herein, each of the object data records 432a, 432b . . . 432n also includes a functions property <FUNCTION> which identifies a generic function object that corresponds to the object. The function property value identifies one or more functions from the function library 128 that are appropriate of the object data record 432a, 432b, or 432n. For example, an object may have a <FUNCTION> value equal to a temperature sensor function from the library 128, a room control function from the library 128, a pump device function from the library 128, or any other function for a generic BAS device or subsystem type.

In addition to identification information, object type information, and present value properties, the object data records 432a, 432b . . . 432n may suitably have many other properties, including references to a graphic element, a pdf document, manufacturing information, maintenance information, and the like.

Referring again to FIG. 1, the system database 124 is operably accessed through and maintained by the data server 125. More specifically, the data server 125 is a software program that (when executed by the CPU 152), manages the data in the system database 124, including the management of the operations that obtain system data from the BAS devices 102a, 102b . . . 102n, and communicates changes or commands to the BAS devices 102a, 102b . . . 102n.

The function mappers 130 are software functions that, when executed by the CPU 152, map data from the data objects in the database 124 to corresponding function definitions of the function library 128. Further detail regarding the function mappers 130 is provided below in connection with FIG. 2A.

The secondary storage 162, which may suitably be non-volatile storage, stores the system historical data and other reference information, such as a pdf document library or the like.

In general, the CPU 152 executes the operations of the software elements 110, 125, 128 and 130 to perform the operations of the management system 100 as described herein. Specifically, the CPU 152 performs the operations of FIGS. 8, 9A, 9B, 10, 11, 12, 13, 18, 19 and 21, as discussed further below, to carry out one or more BAS operations such as the operation 110.

Before discussion of the specific operations of the system 100 of FIGS. 2 and 3, the general operation of the system 50 will be described. In the general operation of the system 50, the BAS devices 102a, 102b . . . 102n operate to provide heating, ventilation and air conditioning to the building in accordance with normal practices using any suitable conventional techniques. Alternatively, or in addition, at least some of the BAS devices 102a, 102b . . . 102n operate to provide monitoring for, and if necessary, notification of, a hazardous condition such as fire, smoke or toxic gas release, or operate to provide motion sensing, video surveillance information, and door position monitoring, and the like in accordance with normal security system practices.

The management system 100 operates to provide a user with access to monitor and/or control some or all of the BAS devices 102a, 102b . . . 102n.

To this end, the CPU 152 employs the data server 125 to exchange data with at least some of the BAS devices 102a, 102b . . . 102n (directly or indirectly) via the network I/O unit 154. The CPU 152 maintains the system database 124 based on, among other things, the received data from the devices 102a, 102b . . . 102n. In another aspect of operation, the CPU 152 conveys command values from various elements in the management system 100 to the various devices 102a, 102b . . . 102n, also via the network I/O unit 154. For example, by executing a commanding operation (e.g. operation 110), the CPU 152 may communicate commands to various devices 102a, 102b . . . 102n via the interface the network I/O unit 154.

One aspect of the system 100 is the ability to operate with data from various devices in an efficient manner. To this end, the management system 100 employs the generic functions of the function library 128 to provide uniform data interfaces to the data from various devices. This feature is illustrated through, among other things, FIG. 2A.

Figure 2A:
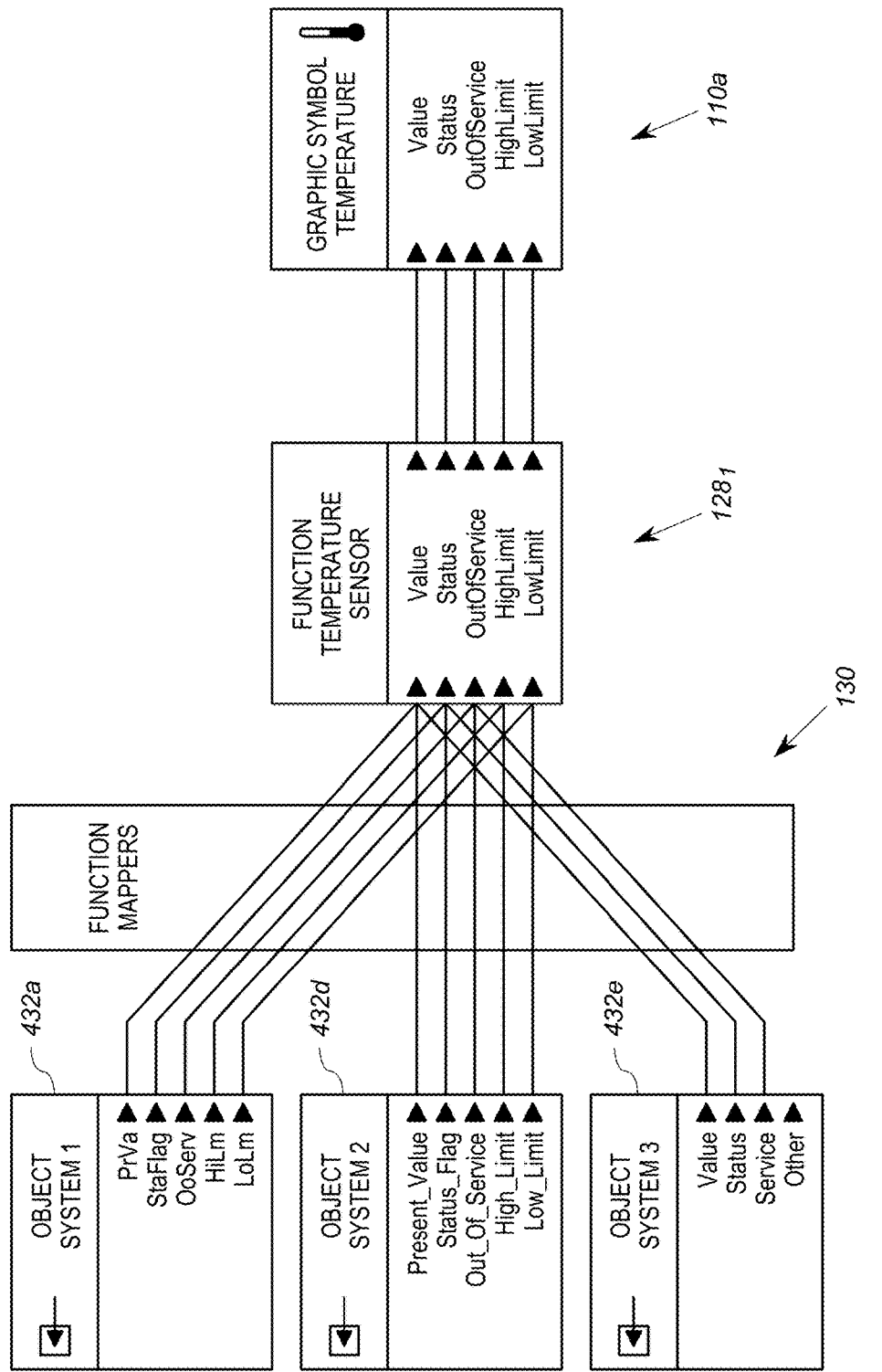
FIG. 2A shows a diagram of the functional relationship between an exemplary software function and exemplary data elements of the management system of FIG. 1.

FIG. 2A shows the functional relationship between the software functions 110, 128, and 130 for an exemplary operation 110a. In general, FIG. 2A illustrates how the operation 110a accesses data to any or all of object data records 432a, 432d, and 432e in the database 124 through a uniform data interface provided by the corresponding function 128₁ as further described below.

In the example of FIG. 2A, a portion of the database 124 includes three object data records 432a, 432d, and 432e, each of which is a data object for an analog output associated with a corresponding temperature sensor, not shown. The corresponding temperature sensors, however, do not all generate the same output values in the same format. Accordingly, the data types supported by the object data records 432a, 432d, and 432e are not uniform. The object data records 432a, 432d, and 432e all include references to system data. For example, the object data record 432a includes references to active values "present value" "status flag", "out of service", "high limit" and "low limit" for a specific temperature sensor output, not shown. The object data record 432d includes references to the same values for a different temperature sensor, also not shown. The object data record 432e includes references to active values "present value" "status" and "service" as well as "other property" for yet another temperature sensor output, also not shown.

With continuing reference to FIG. 2A, the function mappers 130 include a plurality of software functions that convert data accessed via the various object data records 432a, 432d and 432e into a format of data for a corresponding function 128₁.

The function 128₁ is one of the functions from the function library 128 that is specific to temperature sensor analog outputs. It will be appreciated that in FIG. 2A, the common static properties of the function 128₁ (e.g. the icon 184/185 of FIG. 1A) are omitted for the purposes of clarity of exposition. Specifically the function 128₁ is a data record (and may suitably be another object) that defines a uniform data interface to a temperature sensor analog output that may be used by an operation (such as the operation 110) that accesses or requires data from such an analog output. The function 128₁ provides temperature sensor data in a uniform format. Thus, the accessing software operation need not be configured specifically for the data format of the object data record 432a, 432d, or 432e specifically.

In the example of FIG. 2A, the operation 110a is an operation that formulates a display of a graphical symbol depicting various values relating to a select temperature sensor analog output (which may be selected by an operator selecting from a user interface display a corresponding point identification associated with a particular BAS device 102a, 102b or 102n as described in further detail herein). The operation 110a is configured to obtain temperature sensor data in a predetermined format defined by the function 128₁, and in this embodiment, the identification of an appropriate graphic control 186 from the function 128₁. (See FIG. 1A). Accordingly, the operation 110a need not be defined for the specific format of the temperature sensor data that is associated with the analog output TS₁₃ 102 of the object data record 432a that corresponds to or is the proxy for the selected point of the respective BAS device 102a, 102b or 102n. It will also be appreciated that the operation 110a may, instead of generating a graphical symbol, be an operation that provides data for reports, printing, alarm notification and/or other BAS operations.

Referring to the operation of the example of FIG. 2A, whenever the CPU 152 executes the operation 110a to formulate a graphic symbol for a user selected or particular temperature sensor (such as BAS device 102a in FIG. 1), the CPU 152 obtains the data from the database 124 via the function 128₁ for that temperature sensor object data record 432a, 432b, or 432e. The function 128₁ is configured to provide the data from the database 124 in a uniform data output format for all temperature sensors, regardless of their manufacture, model or capabilities. To this end, the CPU 152 obtains data from the database 124 via the reference in the object data record 432a, 432b, or 432e that corresponds to the temperature sensor (e.g., BAS device 102a) from which data is required, and employs the function mapper 130 to convert the data as provided via the object data record 432a, 432b, or 432e to the uniform format identified by the function 128₁. The operation 110 may then render the graphic thermometer using conventional graphic techniques, and using the values obtained via the function 128₁.

Figure 3:
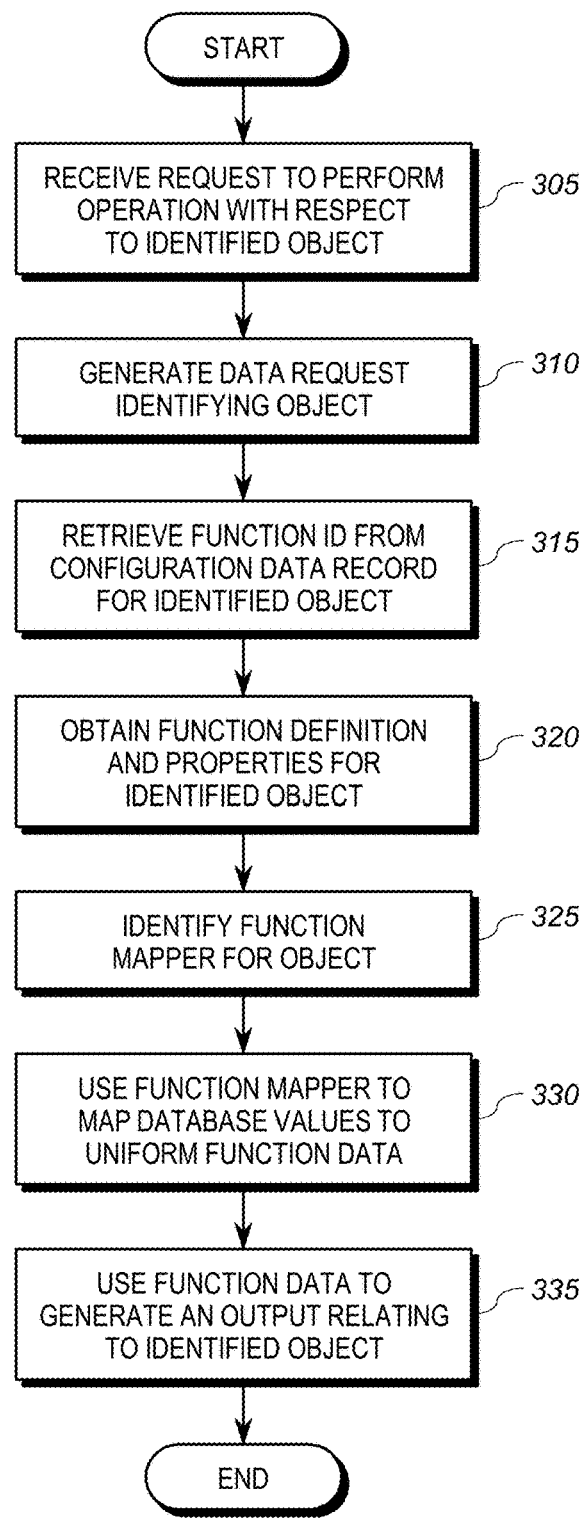
FIG. 3 shows a process flow diagram of an exemplary set of operations of the management system of FIG. 1 in accordance with an embodiment of the invention.

FIG. 3 shows a more generalized process flow of the CPU 152 in carrying out an operation 110 using the function library 128 and the function mappers 130 to obtain data from the database 124.

In step 305, the CPU 152 receives during the execution of an application or other software element an identification of an operation to be performed (e.g. display graphic control) and an identification of at least a first system object (i.e. object data record 432a, 432b, or 432n) which is to be used in the performance of the operation. In the example of FIG. 2A, the CPU 152 in step 305 would receive a call to process the graphic symbol generating operation 110 and an identification of the analog output object associated with one of the data records 432a, 432d and 432e.

In step 310, the CPU 152 generates (from the operation) a request identifying the object (or object data record). In general, the request need not be made with a particular object type in mind. One of the purposes of the function library 128 is to present common and uniform data outputs from different types of objects, as well as different manufactures of BAS devices associated with the same type of objects (e.g., temperature sensor object type). In the example of FIG. 2A, the CPU 152 may request the object data record 432e.

The CPU 152 then, executing another procedure, receives the request, and executes step 315. In step 315, the CPU 152 obtains configuration data in the corresponding object data record 432a, 432d, or 432e to obtain the function property value for the object data record 432a, 432d, or 432n. As discussed above, the function property <FUNCTION> of each object data record 432a . . . 432n identifies the function or functions from the function library 128 that is (or are) appropriate for the object data record 432a . . . 432n. Thus, in the example of FIG. 2A, the operation 110a would identify that function property value for the select object data record (e.g. object data record 432e) is the "temperature sensor" function 128₁. The CPU 152 thereafter proceeds to step 320.

In step 320, the CPU 152 identifies retrieves the identified function definition, and obtains general static properties therefrom. The CPU 152 may also obtain from the function the identification of relevant available variable properties. Thus, in the example of FIG. 2A (and 1A), the CPU 152 would retrieve the function definition 128₁ of FIG. 1A in step 320, and determine that the icon 184 (referenced by the reference 185) may be used by the operation 110a to provide an icon for display, and may determine that a certain graphic control or definition 186 may be used by the operation 110a to provide a graphic display of the select object data record. The CPU 152 also preferably determines in step 320 the available property values from the list 182 that are available from the function definition 128₁. The CPU 152 may then, depending on the operation, determine which of the system values to retrieve based on the available property values, determine a layout or other display features based on the available property values, or the like.

In step 325, the CPU 152 identifies a particular function mapper within the set of function mappers 130 associated with the object data record 432a . . . 432n. Thus, in the example of FIG. 2A, the CPU 152 would identify the function mapper 130 specific to the object data record 432e.

In step 330, the CPU 152 executes the identified function mapper 130 to obtain data relevant to the identified object data record from the database 124, and map the data to a uniform data interface format defined by the function 128₁. Thus, for example, the data point "Value" referenced by the data object 432e in FIG. 2A may have a different format than the uniform format employed by the function 128₁. In such a case, the function mapper 130 provides the conversion from the "Value" obtained from the database 124 to the "present_value" format employed by the function 128₁. The function mapper 130 similarly provides a conversion for other values from the database 124 referenced by the identified data object 432a. In some cases, the underlying data object (such as object data record 432e) may not include support for all of the data or properties required by the function. In such a case, the function mapper 130 provides a null value for the function value of the missing property.

In step 335, the CPU 152 continues execution of the operation 110a either directly or indirectly to generate an output based on the data received via the function. In the example of FIG. 2A, the CPU 152 in step 330 performs the operation 110a to generate and display a graphic for a temperature sensor BAS device using the values returned by the identified function wrapper 130.

Figure 5:
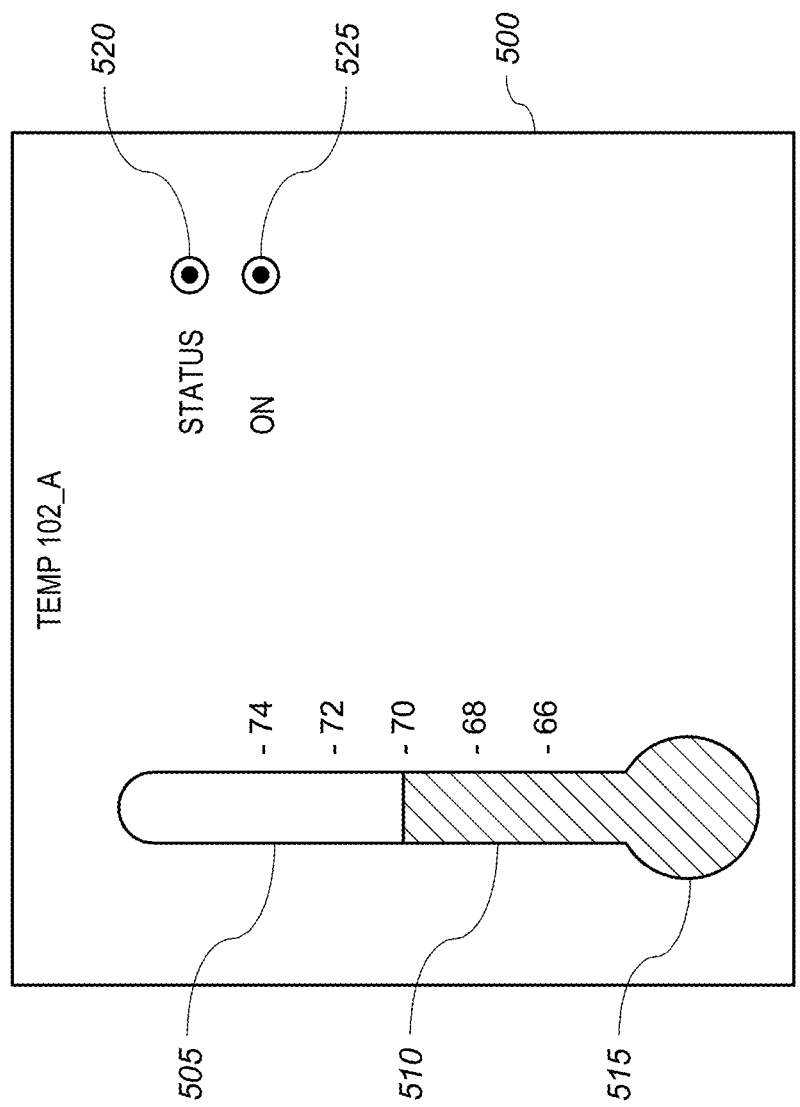
FIG. 5 shows as graphic element of a temperature sensor that has a variable appearance based on the values generated within the system of FIG. 1.

For example, FIG. 5 shows as graphic 500 of a temperature sensor that has a variable appearance based on the returned values from the function $128_1$. The graphic 500 has a "thermometer" type graphic element 505 wherein the "present value" has been used to determine how far up the solid bar 510 extends upward from the base 515. The graphic 500 include a status indicator 520 and an in-service indicator 525 that indicate the status (i.e. good or fault as reflected by the indicator 520) and service (i.e. off or out of service, or on or in-service as reflected by the indicator 525), respectively, using graphic representations of indicator lights. The color of the indicators 520 and 525 reflects the value of that parameter as returned by the function $128_1$.

It can be seen, therefore, that the CPU 152 may execute the operation 110 to generate a graphic representation of a temperature sensor in the system, without having to use special code or variables for different kinds of physical sensors having different output values. The use of the function $128_1$ presents a uniform data interface to many sensors' values as stored in the database 124. It will be appreciated that in this embodiment, the original format of the data is nevertheless preserved in the database 124 so that other functions or applications may access the data in its original format, if desired.

For example, as disclosed in further detail herein with at least reference to FIGS. 7, 7A, 20 and 22, the application framework 610 is configured to generate a multi-pane display or screen 700 that includes a primary work area or pane 720 that has associated tabs $724_1$, $724_2$ and $724_3$ for a user to select among a first plurality of snap-in tools or applications and a contextual work area or pane 704 that also has associated tabs $727_1$ and $727_2$ for a user to select among a second plurality of snap-in tools or applications tools. In one implementation as reflected in FIG. 22, when the graphic element 2200 is generated by the application framework 610 based on the selection of an object from a hierarchical list 718 of objects in FIG. 7A (e.g., each of which corresponds to an object data record 432a, 432b, or 432e in FIG. 2A). In some cases, a user may further select by suitable means to cause the corresponding snap-tool application or operation 110a to display one or more additional data values of the selected object data record 432a, 432b, or 432e that have not been mapped to the function $128_1$.

The basic architecture and operation of generic functions as described above may readily be implemented to enable many different types of operations to access data for many different types of BAS devices. Indeed, a single operation may employ data from any number of different types of objects using any number of different types of functions. For example, if an operation is used to merely display the name of an object, its present value (as text) and its status, then such an operation may employ the steps of FIG. 3 to generate instances of any number of functions for any number of different types of objects. To this end, it will be appreciated that many building system objects (temperature sensor outputs, flow sensor outputs, smoke detector devices, etc.) associated with BAS devices will have, at a minimum, an associated "present_value" property and an associated "status" property. Accordingly, each function $128_x$ for each associated building system object type is capable of providing "present_value" data and "status" data in a uniform format.

The ability to use generic operations for accessing data regarding several types, makes, and models of BAS devices (via defined functions 128 and function mappers 130) is especially advantageous in a management system that is used for several different building automation systems.

Figure 2B:
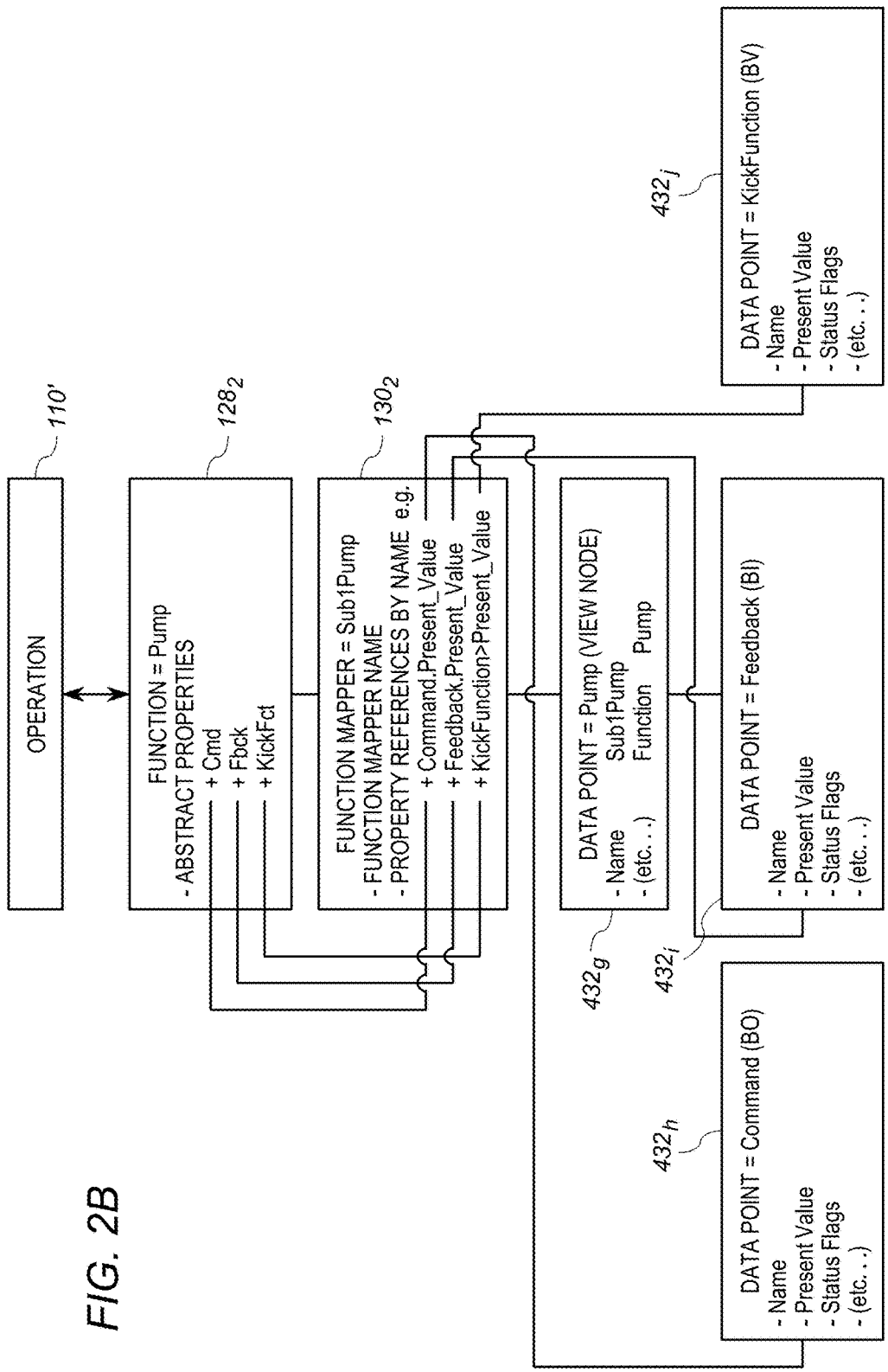
FIG. 2B shows a diagram of the functional relationship between another exemplary software function and other exemplary data elements of the management system of FIG. 1.

As discussed above, it is also possible to use functions from the function library 128 to access data for an object that is associated with multiple data points or multiple objects. For example, FIG. 2B shows a representative diagram of the relationship of an exemplary operation 110', a function $128_2$ for a pump, a function mapper $130_2$ for a specific pump, and object data records 432g, 432h, 432i and 432j. In this example, the object record 432h represents a command value for a specified pump Sub1Pump, the object record 432i represents a feedback value for the specified pump Sub1Pump, and the object record 432j represents a kick-function value for the same specified pump. The object data record 432g represents a node for the pump Sub1Pump. While each of the data records 432h-432j represent a system value having a present value, the object data record 432g does not. The pump object data record 432g represents a hierarchical construct that contains (or is the hierarchical parent of) the object data records 432h-432i.

In the example of FIG. 2B, a function $128_2$ has been defined for a pump type object, with defined values for Command (Cmd), Feedback (Fbck) and Kick Function (Kickfct). Moreover, the function mapper $130_2$ has been defined to obtain and map data from all the child object data records 432h-432i for the pump data record 432g to the function $128_2$. When the operation 110' identifies that it requires any of the values Cmd, Fbck and/or Kickfct for an application (display, report, etc.), then function $128_2$ provides the data via the function mapper $130_2$ and the object data records 432h-432i. In such a case, the operation 110' may suitably only identify the values requested and the identity of the object "Sub1Pump". The CPU 152 would then obtain the function property for the "Sub1Pump" object data record 432g, which provides the identity of the function "pump" $128_2$.

It will be appreciated that the ability to map several object data records (such as the object data records $432_h$, $432_i$, and $432_j$) to a single instance of a function (such as the function $128_2$) allows for increased flexibility. In one example employing the same architecture as shown in FIG. 2B, a function defined for a "room" object may include properties mapped to object data records for inputs or outputs of different types of BAS devices typically found in a room, such as temperature sensors, humidity sensors, controllers and the like. In such a case, the function $128_2$ would be a "room" function, the object data records $432_h$, $432_i$, and $432_j$ may suitably correspond to, respectively, a temperature sensor output, a humidity sensor output, and controller set point input. The object data record $432_g$ would correspond to a specific room within the facility, and the function mapper $130_2$ would be configured to map between the specific formats of the data provide in the object data records $432_h$, $432_i$, and $432_j$ and the format of the function $128_2$.

Figure 6:
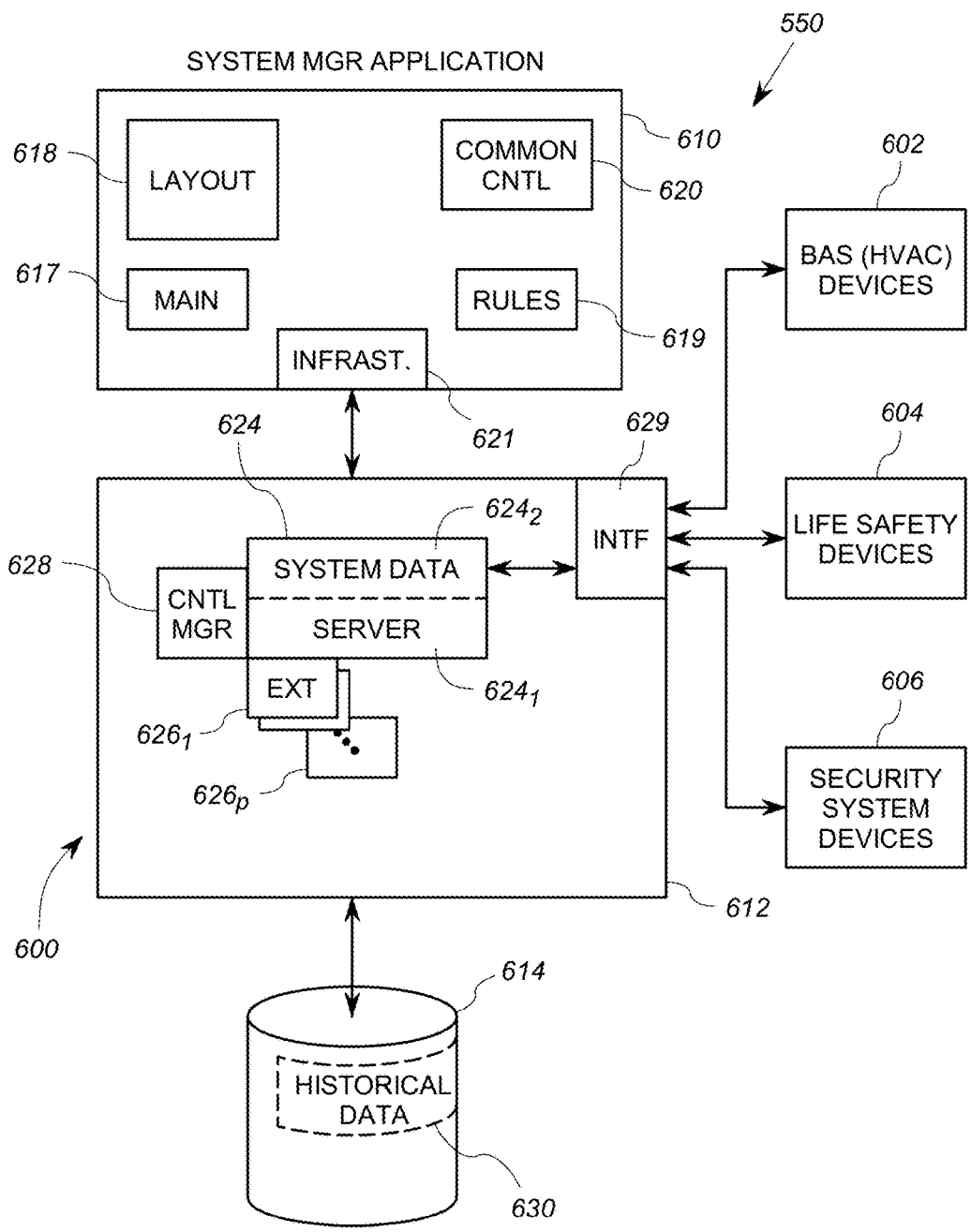
FIG. 6 is a functional block diagram of the global management system in use with BAS (HVAC) devices, fire safety devices, and security system devices.

At least some embodiments of the invention are incorporated to a global management system. Specifically, FIG. 6 illustrates a system 550 that includes a plurality of different building automation systems and a global management system 600. Specifically, the global management system 600 of FIG. 6 is configured to facilitate monitoring, managing and controlling among other things, a comfort (HVAC)

system, a life safety system and a security system (including access control systems and CCTV systems). In particular, FIG. 6 illustrates functional blocks of a first embodiment of global management system 600 implemented in connection with comfort system (HVAC) devices 602, life safety devices 604, and security system devices 606. Together, the management system 600, comfort system devices 602, life safety devices 604, and security system devices 606 form a comprehensive building system 550. It will be appreciated that the comfort system devices 602 preferably cooperate to form a building comfort system, the life safety system devices 604 cooperates to form a building life safety system, and the security system devices 606 cooperate to form a building security system. The management system 600 allows for such diverse systems and devices to be managed, monitored and controlled from a single point, and in a uniform manner.

Figure 6A:
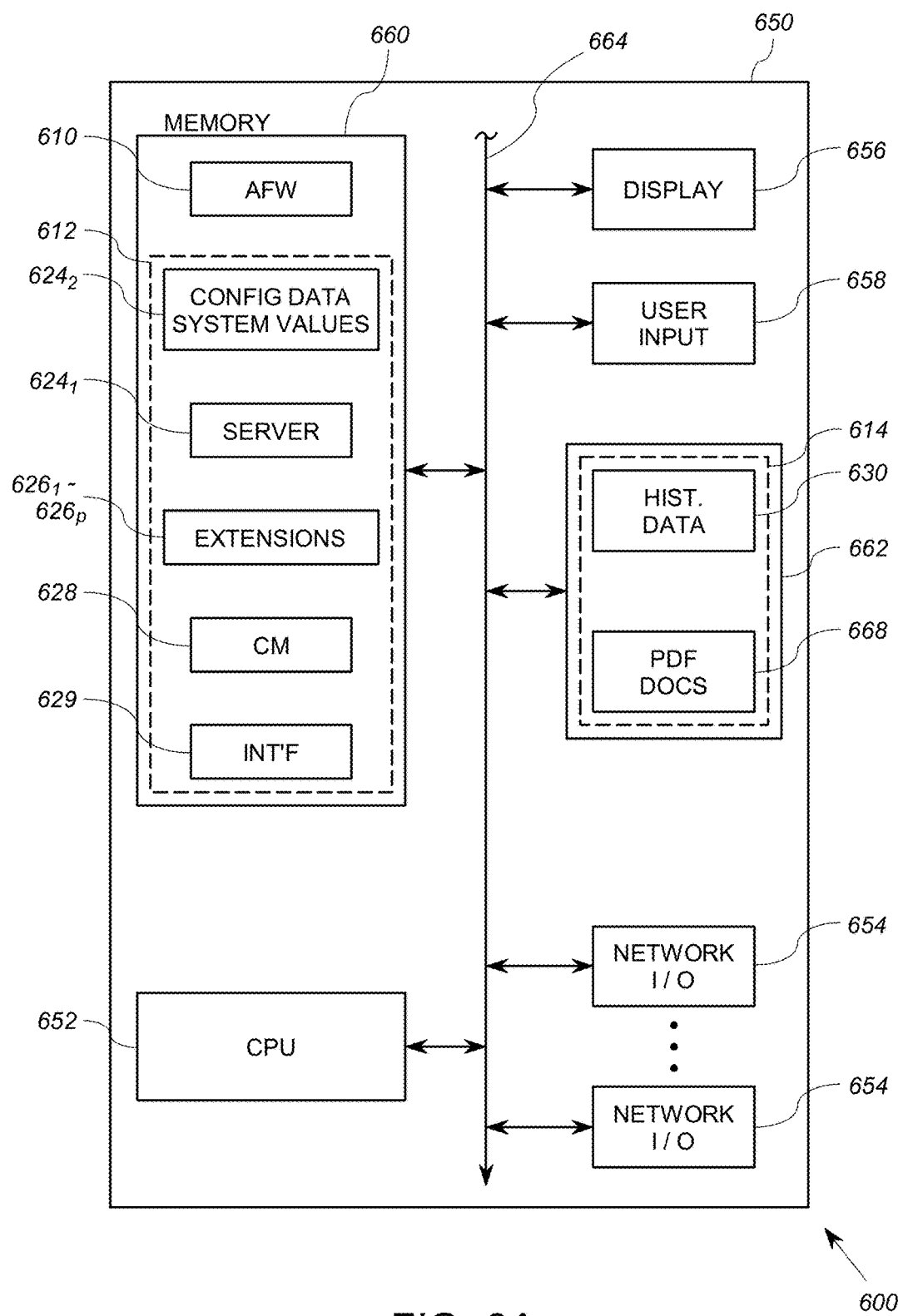
FIG. 6A is functional block diagram of a computing device that carries out the functions of the global management system of FIG. 6, as well as a graphical user interface according to embodiments of the invention.

In FIG. 6, the management system 600 is shown in functional blocks that are representative of executed software programs and stored data. In FIG. 6A, a block diagram of a computer device 650 implementing the management system 600 is shown, and discussed further below.

As shown in FIG. 6, the management system 600 includes an application unit or application framework 610, a core engine 612, and a data repository 614. FIG. 6A shows the application framework 610, the core engine 612 and data repository 614 disposed on a single computer workstation. It will be appreciated, however, that any or all of the application framework 610, the core engine 612 and data repository 614 may suitably be distributed on separate computing devices.

The application framework 610 is a collection of software and associated data files that enable a client application or session. In this embodiment, the application framework 610 enables a system manager application that provides a user interface for monitoring, reviewing and controlling various points and devices in the system 550. The application framework 610 includes, among other things, a main executable 617, a user layout definition file 618, a set of rules 619, a common graphics control module 620, and an infrastructure interface 621. The core engine 612 includes a model/repository 624, a number of software extensions $626_1$... $626_p$, a control manager 628, and device interface stacks 629. The data repository 614 includes, among other things, a historical database 630.

Referring to the core engine 612 as depicted in FIGS. 6 and 6A, the model/repository (MR) 624 includes a data server $624_1$ and a system database $624_2$. The system database $624_2$ includes, among other things data model of all data points and all (or most) devices and other objects in the system 550. In particular, as is known in the art, each value of an active building system (temperature, alarm status, humidity), can be referred to as a point or data point. In this embodiment, objects of the system 550 include anything that creates, processes or stores information regarding data points, such as physical devices (BAS controllers, field panels, sensors, actuators, cameras, etc.), and maintained data files such as control schedules, trend reports, defined system hierarchies, and the like.

Accordingly, the system database $624_2$ includes, among other things, current values of the various points in the system 550, and configuration information for the various objects in the system 550. The MR 624 is the mechanism by which application framework 610, as well as other applications, can access data generated by the various system devices 602, 604, and 606, and provide data (i.e. commands) to such devices.

As will be discussed below in detail, one type of objects maintained in the system database $624_2$ consists of hierarchy definitions that identify relationships between objects in the system. These relationships are preferably hierarchical, as will be discussed further below. In particular, it is known to organize objects in building automation systems as a hierarchy. For example, a system may define an object "floor" with multiple child objects in the form of "rooms". Each "room" object, in turn, may have several child objects such as "ventilation damper", "smoke detector", and "temperature sensor". Such hierarchy definitions among objects are conventional in nature, and may take many forms. It will be appreciated that the use of hierarchical files in the system 600 allows for technicians to define nearly any desirable hierarchy, the result of which is stored as one of the defined hierarchical files, discussed further below. In this embodiment, the MR 624 maintains files (i.e. objects) identifying different versions of hierarchies between the objects of the system, including those representative of the devices 602, 604, 606.

The software extensions $626_1$ ... $626_p$ are sets of software services that provide core operations of the management system 600 via the model repository 624. The software extensions $626_1$ ... $126_p$ are preferably composed in source code, compiled and linked using conventional techniques. The software extensions $626_1$ ... $626_p$ may suitably include a print manager, a reporting subsystem, and a status propagation manager. For example, a reporting subsystem is a system that manages the acquisition of data values from the MR 624 for the generation of various reports. Such reports may include, for example, trends for a temperature of a room or the like. The generation of reports and methods of managing the same using a data model such as the MR 624 is conventional and the details thereof is omitted for clarity of exposition. In another example, the status propagation manager is a device that propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein to the extent permitted by law.

The control manager 628 is another software service that enables use of system data via the MR 624. Specifically, the control manager 628 facilitates use of high level scripts to provide services within the management system 600. In other words, in contrast to the software extensions $626_1$ ... $626_p$, the control manager provides an execution environment for high level scripts. In particular, the control manager 628 is configured to execute software scripts that perform various services. In this embodiment, the control manager 628 executes a script to carry out the scheduling function of the management system 600. The scheduling function is used to control points in the various systems based on a time-based schedule. For example, the scheduling function may be used to command temperature set points based on the time of day, and the day of the week, within the comfort system devices 602. It will be appreciated that the scheduling function in other embodiments may simply be implemented as another software extension $626_x$. However, in this embodiment, the control manager 628 allows for functionality to be added to the management system 600 via scripts, as opposed to low level source code that must be compiled and linked.

The interface stacks 629 are a set of functional modules that act as an interface between the core 612 and the various comfort system devices 602, the various life safety devices 604, and the various security system devices 606. The comfort system devices 602 can suitably include field controllers, actuators, sensors, and other devices normally associated with HVAC systems, all of which may communicate on a suitable network, as is known in the art. The life safety system devices 604 can suitably include notification appliance circuits (NACs), NAC control panels, other controllers, and other devices normally associated with fire safety and/or life safety systems, all of which may communicate on a suitable network, as is known in the art. Similarly, the security system devices 606 can suitably include field controllers, cameras, sensors, and other devices normally associated with security systems, all of which may communicate on a suitable network, as is known in the art. One or more of the devices 602, 604 and 606 may operate on a specific network protocol, such as BACnet or LonTalk. The interface stacks 629 provide access to data within such network protocols by services within the management system 600.

Referring now to the application framework 610, in the embodiment described herein, the application framework 610 is an application and other software components that cooperate to provide a multi-area or multi-pane display window on a computer display, such as the display 700 of FIG. 7A discussed further below. The multi-pane display (see e.g. FIGS. 7 and 7A) include an object selection area 715, primary and context display areas 720, 725 for displaying information about a selected object and elements within the object, and an automatically generated "related items" area 730 that displays other objects that bear a predefined relationship to the selected object or a relationship established dynamically during operation of the management system 100 as discussed in further detail herein for related items identified as static elements and dynamic elements, respectively. Many or most areas or panes of the multi-pane display screen 700 have selectable links to additional information.

Figure 17:
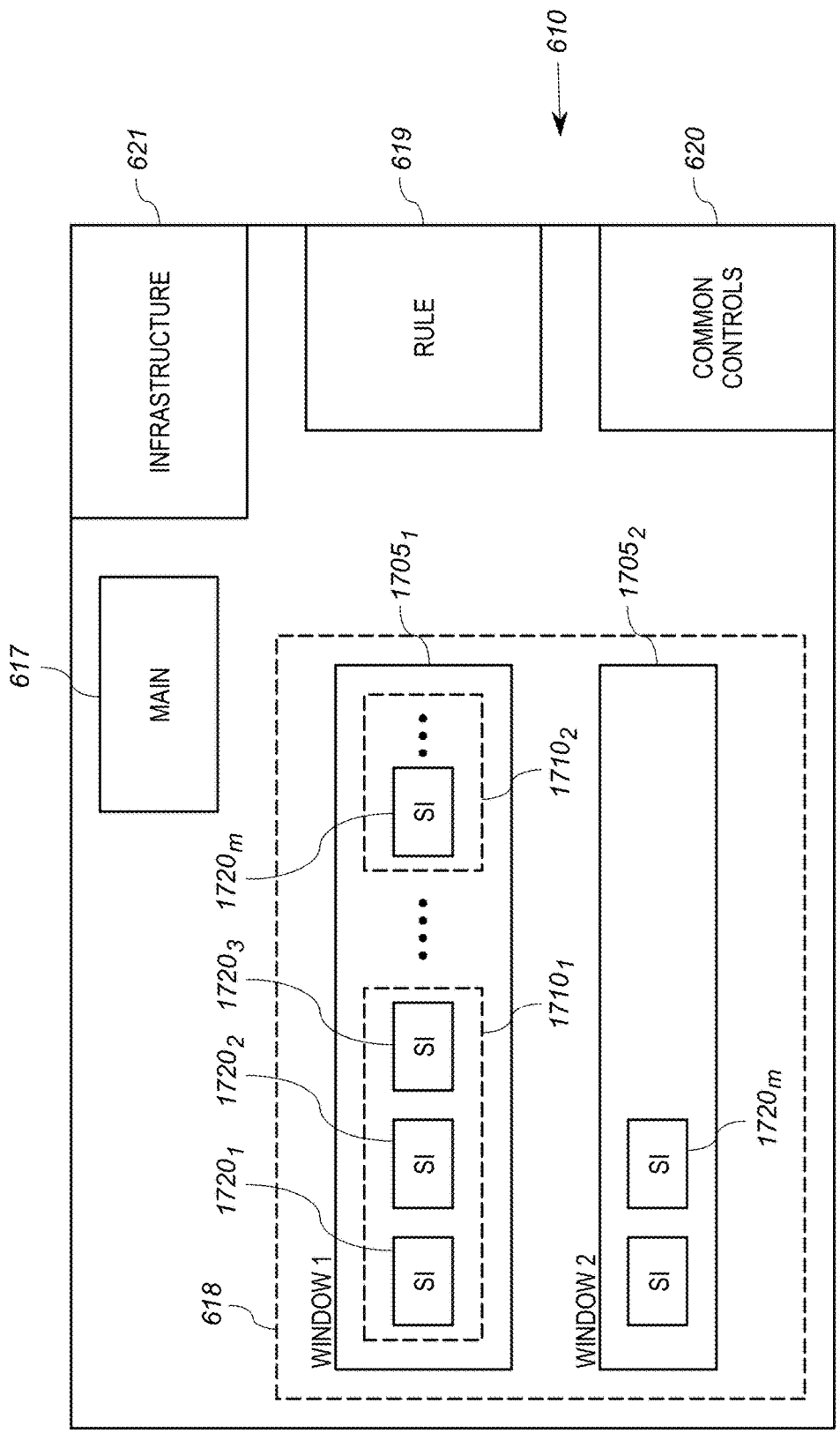
FIG. 17 illustrates a representative diagram of elements of an application framework for a user interface function according to an embodiment of the invention.

FIG. 17 shows in further detail the application framework 610. With reference to FIGS. 6A and 17, the infrastructure 621 is a software module that acts as an interface, similar to an application programming interface (API), to the various elements of the core engine 612, including the MR 624. The main executable 617 includes programming instructions that coordinate the actions of the other modules of the application framework 610. The common graphic controls 620 include graphic libraries for various objects and points. For example, the graphics controls 620 may include a thermometer graphic definition for temperature sensors, or a "speedometer" type graphic definition for pressure sensors. The graphics controls 620 are common files (or copies of common files) that are used by multiple applications, and not just the application framework 610. The layout 618 is a file that defines the display format, such as whether graphical displays, text displays, camera images or the like are to be displayed. In the embodiment described herein, the layout 618 is defined in connection with each user's profile, or in the alternative, with an authorization level or other user selection. Thus, the appearance of the display can vary from user to user, even though such users employ the same application framework 610.

The rules 619 define how the application framework 610 populates the various areas of the display based on the defined layout 618. It will be appreciated that while the layout 618 can vary by user, the rules 619 do not. However, in contrast to the common graphic controls 620, the rules 619 are specific to the application framework 610.

Figure 7:
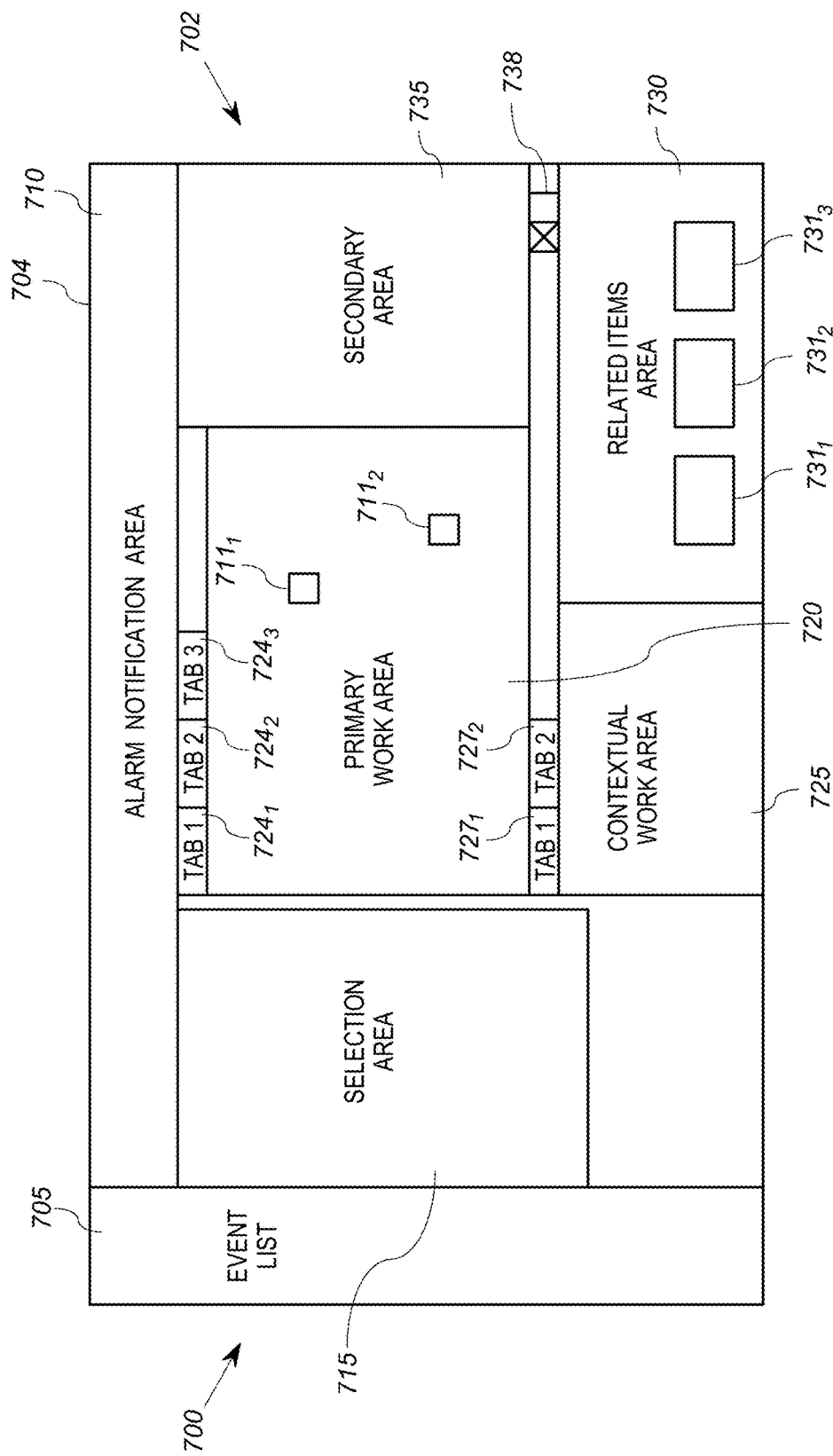
FIG. 7 is a representative block diagram of a screen display generated by the graphical user interface function carried out by the computing device of FIG. 6A.

Referring now to FIG. 7, there is shown a diagram of a display screen 700 generated by the application framework 610. As briefly mentioned above, the display screen 700 includes a first window 702, a second window 704 and a third window 705. The first window 702 includes a selection area 715, also referred to as a system browser, a primary work area 720, a contextual work area 725, a related items area 730, and a secondary work area 735. In this embodiment, the second window 704 includes alarm notification area 710. Other windows may be incorporated. While outside the scope of the current invention, the alarm notification area 710 may suitably appear as, and be generated as, shown in European Patent Specification EP 1515289 B1, which is assigned to the Assignee of the present invention and is incorporated herein by reference. The third window 705 may include details of certain events, and is also outside the scope of the present disclosure.

Figure 7A:
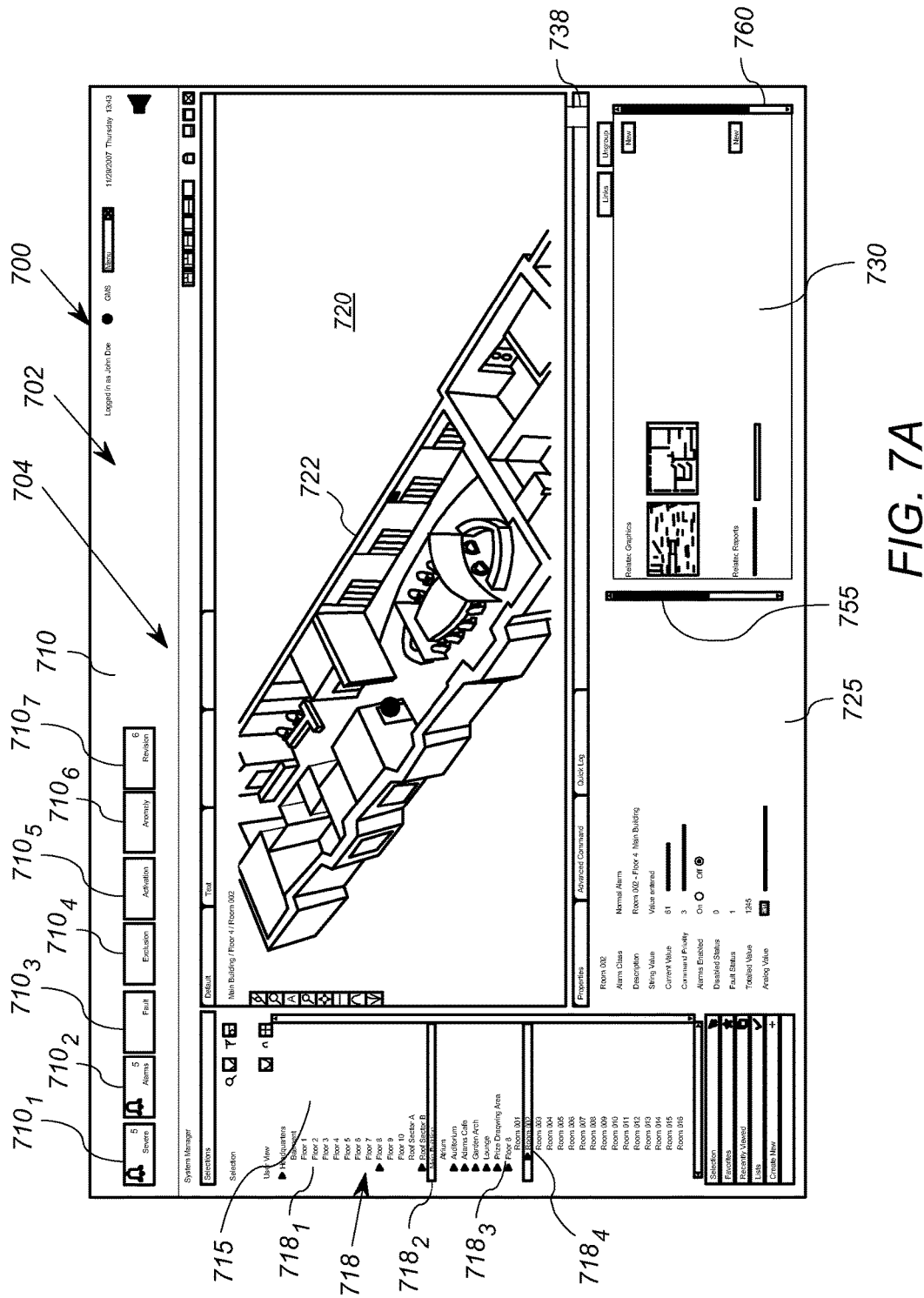
FIG. 7A shows a screen capture of the exemplary screen display of FIG. 7 populated by data for a specific building system.

Reference is also made to FIG. 7A, which shows an example of the display screen 700 as populated by data from an exemplary system, with the exception of the third window 705. As shown in FIG. 7A, the alarm notification area 710 includes a plurality of icons $710_1$, $710_2$, $710_3$, $710_4$, $710_5$, $710_6$ and $710_7$, each indicating a type of fault or alarm, and the quantity of the given fault in the current state of the system. For example, the icon $710_1$ illustrates that five severe conditions exist, the icon $710_2$ shows that five alarm conditions exist, and the icon $710_7$ shows that six advisory notifications exist. In general, the user may drill down to each type of notification by selecting one of the icons $710_1$, $710_2$, $710_3$, $710_4$, $710_5$, $710_6$ and $710_7$. As discussed above, however, the details of the operation of the alarm notification area 710 are beyond the scope of the present disclosure.

Referring still to the exemplary screen capture of FIG. 7A, the selection area 715 includes a hierarchical list 718 of objects (e.g. objects $718_1$, $718_2$, $718_3$, and $718_4$) for a building campus. The hierarchical list 718 is based on a hierarchical definition file stored in memory, as will be discussed further below. The hierarchy logic employed in the list 718 may take a plurality of different forms. In the example of FIG. 7A, the hierarchy logic is geographical, or space-based. Accordingly, the first or highest level of the hierarchical list 718 includes buildings such as "Headquarters" and "Main Building". The next highest or second level of the hierarchical list 718 includes floors and/or large areas of the buildings, such as "Floor 1", "Floor 2", "Auditorium", and "Floor 4". The third or next highest level of the hierarchy includes rooms and/or smaller divisions of the floors/large areas of the second level.

For example, the icon $718_4$ is a room "Room 002", which is part of the sub-list for (sometimes referred to as a "child" of) icon $718_3$, which represents "Floor 4". The icon $718_3$, moreover, is part of the sub-list for (or child of) icon $718_2$. which represents the object "Main Building". This particular hierarchical string illustrates that "Room 002" is a child of "Floor 4", which in turn is a child of "Main Building".

Referring again generally to FIGS. 7 and 7A, the user may select any object from the selection area 715. As will be discussed below in further detail, the system 600 thereafter causes the various areas 720, 725, 730 to be populated with data corresponding to the selected object. To this end, as will be discussed below, the rules 619 of the application framework 610 in conjunction with the layout 618 cooperate to define the appearance of the display elements in each of the areas 720, 725, and 730, as well as the selection area 715 and the other windows 704, 705.

In general, the primary work area 720 includes information relating directly to the selected object from the selection area 715. As shown in FIG. 7A, the icon $718_4$ for the Room 002 has been selected, and primary work area 720 shows a perspective floor plan 722 for the selected object "Room 002". The primary work area 720 can alternatively display textual data, drop down lists, and even a document (e.g. a pdf formatted file). As will be discussed further below in detail, the format of the data that is presented in the primary work area 720 will depend upon, among other things, the layout file 618 of the application framework.

The contextual work area 725 is an area of the display 700 that contains information regarding a specific element within the primary work area 720. For example, if the primary work area 720 includes several selectable icons or menu entries, then the contextual work area 725 is used to provide further information relating the user selection from the primary work area 720. In FIG. 7, for example, the primary work area 720 includes selectable icons $711_1$ and $711_2$. If the user were to select one of the icons $711_2$, then the contextual work area 725 would provide further information regarding the object associated with the icon $711_2$. By contrast, in the example of FIG. 7A, the primary work area 720 does not include selectable icons. In such a case, the contextual work area 725 is used to simply provide more information about the Room 002. Thus, the contextual work area 725 in FIG. 7A shows the properties of the object 722 shown in the primary work area 720. As a consequence, the contextual work area 725 provides an ability to "drill down" on a selected element (e.g. elements $711_1$ or $711_2$ of FIG. 7) displayed in the primary work area 720, or, as shown in FIG. 7A, provide further information about object's properties that cannot be shown in the format of graphic of the primary work area 720.

The related items work area 730 is a portion of the display screen 700 that includes selectable icons corresponding to other "objects" of the system 600 that relate in a predetermined manner to the selected icon within the primary work 720. For example, the related items area 730 of FIG. 7 includes selectable icons $731_1$, $732_2$, and $732_3$. The icons $731_1$, $732_2$, and $732_3$ link to objects related in some manner to the object represented by whichever of the icons $711_1$ or $711_2$ is selected. The related objects that can include schedules that affect or involve the selected object, reports relating to the object, and other objects identified in properties for the selected object. Further details regarding the generation of the related items area is provided below in connection with FIGS. 9-12.

By way of example, consider that that the icon $711_2$ has been selected in the primary work area 720 of FIG. 7. In such a case, the related items icons $731_1$, $731_2$ and $731_3$ comprise links to information about objects related to the object of the selected icon $711_2$. If, as in FIG. 7A, the primary work area 720 does not have selectable icons, then, as shown in FIG. 7A, the related items area 730 includes selectable icons for objects related to the Room_002 of the primary work area 720. In the example of FIG. 7A, the related items can include floor plan graphics for areas close to or involving the object Room 002, as well as a set of reports relating Room 002.

The secondary area 735 is an area in which information pertaining to a second object selected may be displayed. For example, the system 600 allows the user to select an object from the related items area 730. Information related to the selected related item is then displayed in some cases in the secondary area 735. It will be appreciated that the areas 715, 720, 725, 730 and 735 can be re-sized by the user. Thus, to at least some degree, the user may adjust the relative sizes of the various areas. Suitable graphic tools that facilitate such scalability are known in the art. Accordingly, for example, the secondary area 735 may be collapsed completely to maximize the primary work area, as shown in FIG. 7A.

It will further be appreciated that the areas 715, 720, 725, 730 and 735 also employ standard scrolling tools. In particular, to the extent that all of the information to be displayed does not fit within the any of the areas 715, 720, 725, 730 and 735, standard scroll bars are employed to allow the user to maneuver to different information within the corresponding area. For example, FIG. 7A shows a standard vertical scroll bar 755 for the contextual work area 725 and a standard vertical scroll bar 760 for the related items area 730. In the conventional manner, the vertical scroll bar 755 allows the user to access further information that is currently hidden in the area 725. Similarly, the vertical scroll bar 760 allows the user to access additional related items information in the area 730. Though not shown in FIG. 7A, horizontal scroll bars may similarly be used when warranted.

Accordingly, referring again to FIG. 6, the application framework 610, when executed by a suitable computer processing circuit, facilitates user interaction through the display screen 700 of FIGS. 7 and 7A. Other applications may be used to facilitate other actions by users of the system 600.

As discussed above, the application framework 610 provides for different appearances of the display elements that appear in the windows 702, 704 and 705 based on a user profile, or an authorization level of a user. The layout file 618 contains the display format specific to the user. In particular, FIG. 17 shows the application framework 610, and specifically, the layout file 618, in further detail. The layout file 618 defines a display format including a plurality of window definitions $1705_1$, $1705_2$ (each referenced as $1705_x$), a plurality of panes or area definitions $1710_1$, $1710_2$ (each referenced as $1710_x$) within the one or more of the windows $1705_1$, $1705_2$, and a plurality of snap-in tools or applications $1720_1$ ... $1720_m$ (each referenced as $1710_y$) employed within the window and/or area definitions.

The window definitions $1705_1$, $1705_2$ define the appearance of the windows, e.g. windows 702, 704 and 705 of FIG. 7. To this end, within each window definition $1705_x$ there may be identified one or more areas $1710_x$, and/or one or more snap-in tools $1720_y$. The area definitions $1710_1$, $1710_2$ define the appearance of areas within the windows defined by the definitions $1705_1$, $1705_2$, for example, the areas 720, 725 and 730 of FIG. 7. The snap-in tools $1720_1$ ... $1720_m$ provide the actual format of the display elements within each of the areas $1710_1$, $1710_2$, and/or windows $1705_1$, $1705_2$.

To this end, a snap-in tool or application is a software script or software component (such as a dynamic link library) or program that generates a predetermined layout of data, menus, graphic controls, and the like. The snap-in tools $1720_1$ ... $1720_m$ are configured such that, when the layout file 618 identifies a snap-in tool $1720_y$ for display of a particular set of object data, the snap-in tool $1720_y$ (when executed by a processor) displays the object data in a predetermined layout. In this embodiment, a first snap-in tool $1720_1$ may be used to generate graphic floor plan views, such as that shown in FIG. 7A in the primary work area 720 of FIG. 7A. Another snap-in tool $1720_2$ may be used to generate ordered sets of text data. Another snap-in tool $1720_3$ may be used to generate an arrangement of dialog boxes and other interactive widgets or elements, such as those shown in the contextual work area 725 of FIG. 7A. Still another snap-in tool $1720_m$ may be used to display video data from a camera object. It will be appreciated that the same snap-in tools $1720_y$ may be used in multiple panes or areas $1710_1$, $1710_2$ and multiple areas $1705_1$, $1705_2$. Typically, as will be discussed below, when multiple snap-in tools are defined for an area, only one generates the display, while the others can be accessed by selectable tabs, such as tabs $724_1$, $724_2$ and $724_3$ associated with the primary work area or pane 720 and tabs $727_1$ and $727_2$ associated with the contextual work area or pane 725 as shown in FIG. 7.

In general, the snap-in tools $1720_1 \ldots 1720_m$ in this embodiment are configured to generate displays by accessing various properties of objects. In general, the snap-in tools $1720_1 \ldots 1720_m$ are modular library tools that may be implemented by any running instance of the application framework 610. As discussed above, the layout file 618 may identify that a particular data "object" is to be displayed using a particular snap-in tool $1720_x$. In such a case, the snap-in tool $1720_x$ generates the display by accessing predetermined sets of properties of the data object, and then using that data to construct details of the display. Further detail regarding the operation of the snap-in tools $1720_1 \ldots 1720_m$ is provided below in connection with FIGS. 9A, 9B, 10 and 11.

As discussed above, the elements of the management system 600 of FIG. 6 are shown as functional units. FIG. 6A shows an exemplary embodiment of the management system 600 implemented in a commercially available general purpose computer 650. In this embodiment, the management system 600 includes a central processing unit and associated support circuitry (CPU) 652, a plurality of network input/output (I/O) units $654_1 \ldots 154_r$, a display 656, a user input device 658, a primary memory 660, and a secondary storage device 662. The CPU 652 is configured to execute programming instructions stored in the memory 660 to carryout various operations as described herein. In accordance with such instruction, the CPU 652 is configured to receive data inputs from the user input 658, generate display screens to be displayed on the display 656. The CPU 652 is also configured to communicate with external devices, such as the system devices 602, 604, 606, via one or more of the network I/O units $654_1 \ldots 654_r$. To facilitate the above-described functionality, as well as other functionality, the CPU 652 is operably connected in a conventional manner to each of network I/O units $654_1 \ldots 654_r$, the display 656, the user input 658, the primary memory 660, and the secondary storage 662 via a system bus 664.

In this embodiment, the primary memory 660 stores programming instructions for the application framework 610, the extensions $626_1 \ldots 626_p$, the control manager 628, and software elements of the stack interface 629. The primary memory 660 also stores the elements of the model/repository, which includes the data server $624_1$ and the data base $624_2$. To this end, the primary memory 660 may include volatile memory such as random access memory, as well as other types of readable and writeable memory.

Figure 15:
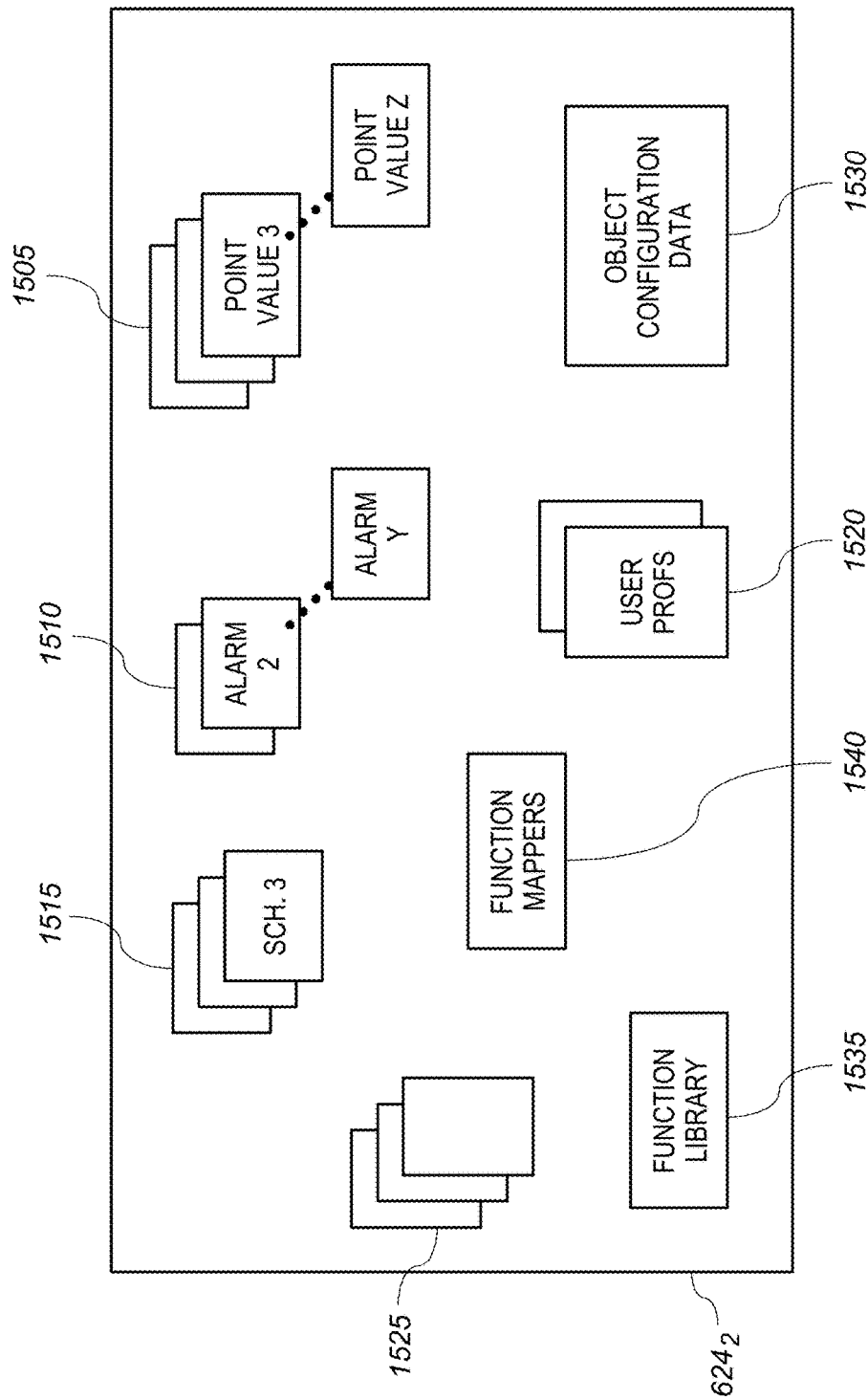
FIG. 15 illustrates a representative diagram of an exemplary data image stored in memory of the system of FIGS. 1 and 1A.

The database $624_2$ is a database containing active system values and data, as well as configuration data for the elements of the system. FIG. 15 shows a functional diagram of contents of the database $624_2$. For example, the database $624_2$ includes present (or latest) values 1505 for the various points of the system 550, including values (e.g. temperatures, set points, fan speed, etc.) of the devices 602, 604 and 606. The database $624_2$ also includes alarms or notifications 1510 and their corresponding statuses. The database $624_2$ further includes schedule files 1515 identifying control schedules. As discussed above, the schedules define a set of timed command values to be communicated to various elements in the systems 602, 604 and 606. In a simple example, a schedule may command the comfort system to employ one set of temperature set points during work hours, and another set of temperature set points on evenings and weekends. In the embodiment described herein, the schedules 1515 are in the form of scripts that are implemented by the control manager software 628. However, it will be appreciated that in other embodiments, the schedules 1515 may be implemented as a software component and set of corresponding schedule data files.

The database $624_2$ further stores user profile information 1520. The user profile information 1520 includes, for each authorized user, a specific layout file that is to be used as the layout file 618 when that user runs the application framework 610. The database $624_2$ also includes hierarchical files 1525 defining one or more sets of hierarchical relationships between data objects within the system. In particular, as discussed above, the "objects" of the system 550 may be defined within a hierarchy. These "objects" can include various devices 602, 604, 606 (discussed further below), the schedule files 1515, one or more stored reports, and various rooms, floors and buildings in which the system 550 is located. Accordingly, hierarchical files 1525 can identify hierarchical relationships between buildings, devices, and even schedules and reports.

Figure 16:
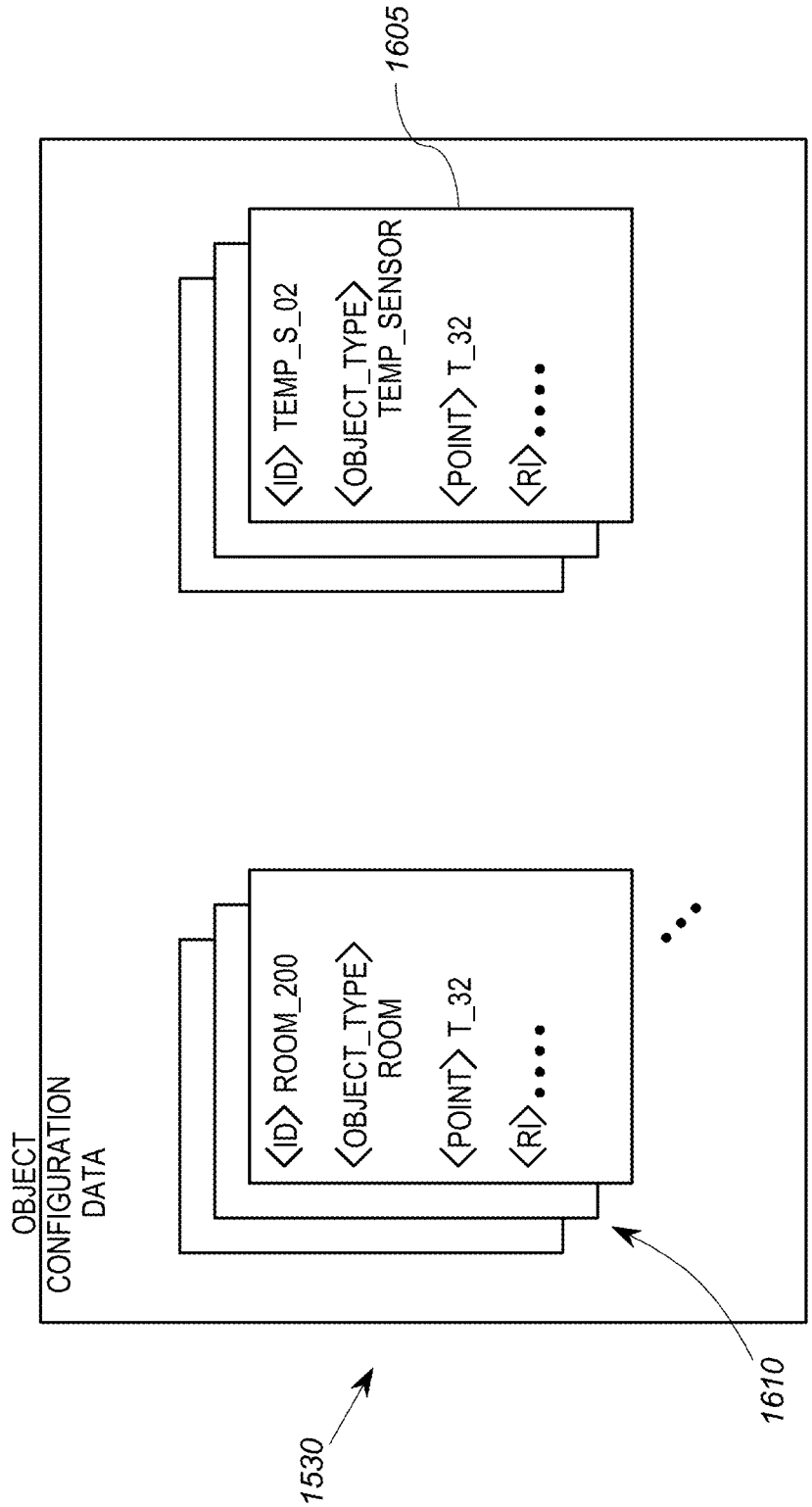
FIG. 16 illustrates a representative diagram of an exemplary configuration database of the system of FIGS. 1 and 1A.

The database $624_2$ also includes object configuration data 1530. Object configuration data 1530 includes an object data record for each object of the system. Thus, for example, each room, floor, building, sensor, camera and field controller has its own object configuration object data record. FIG. 16 shows in further detail a representative diagram of the maintained in the database $624_2$.

The database $624_2$ further contains a function library 1535 similar to the function library 128 of FIG. 1, and a set of function mappers 1540 similar to the function mappers 130 of FIGS. 1 and 2.

As shown in FIG. 16, the object configuration data 1530 includes a set of data object data records 1605 associated with each of the devices 602, 604 and 606 in the system 550, and a set of data object data records 1610 associated with each room, space and building in which the system 550 is located, among other things. The object configuration data 1530 may further includes object data records associated with other logical entities, such as reports, not shown.

Each object data record 1605, 1610 includes a set of predetermined properties, including unique identifying information <ID> and an object type <OBJECT_TYPE>. Several objects may be of the same object type. For example, an object type may be "sensor", "controller", "floor", "room", "hierarchy" etc. The number and type of properties of each object data record 1605, 1610 depends on the object type. Each object data record 1605, 1610 may also contain one or more point properties <POINT> identifying a point value corresponding to the object. As is known in the art, "points" are used to describe operating values of the system, such as temperatures at particular sensors, set points for various actuators or air handling units, and the like. Each object may be associated with one or more points. The same point may be associated with a plurality of objects. Thus, for example, the point T_32, which may represent a temperature sensed by a sensor TEMP_S_02 that is located within ROOM_002 may be a point property for both the object data record 1605 for TEMP_S_02 and the object data record 1610 for ROOM_002. (See FIG. 16). In addition to identification information, object type information, and point properties, the object data records 1605, 1610 may suitably have many other properties, including references to a graphic element, a pdf document, manufacturing information, maintenance information, and the like. The object data records 1605, 1610, further include a related items property <RI> that identifies related items for the objects represented by object data records/models 1605, 1610. The related items for an object can include a reference or link to a video image associated with the object (i.e. from a video camera in the room ROOM_002), a trend report associated with the object, and the like.

In the embodiment described herein, each of the object data records 1605, 1610 may also include a functions property <FUNCTION> (as best shown in FIG. 4A) which identifies a generic function object that corresponds to the respective object or device. The function property value identifies one or more functions from the function library 1535 that are appropriate of the object data record 1605, 1610. For example, an object may have a <FUNCTION> value equal to a temperature sensor function from the library 1535, a room control function from the library 1535, or any other function for a generic BAS device or subsystem type.

Referring again to FIG. 6, the system database 624$_2$ is operably accessed and maintained by the data server 624$_1$. More specifically, the data server 624$_1$ is a software program that (when executed by the CPU 652, manages the data in the system database 624$_2$, including the management of the service that obtains system data from the devices 602, 604 and 606, and communicates changes or commands to the devices 602, 604 and 606.

The secondary storage 662, which may suitably be non-volatile storage, stores the system historical data 630 and other reference information, such as a pdf document library 668.

Referring again to FIG. 6A, the document library 668 may suitably be a set of pdf documents that are associated with various of the devices 602, 604 and 606. It will be appreciated that the secondary storage 662 may also store other files typical of a building control system, such as, for example, the historical database 630.

In general, the CPU 652 executes the operations of the software elements 610, 624$_1$, 626-1 . . . 626$p$, 628 and 629 to perform the operations of management system 600 as described herein. Specifically, the CPU 652 performs the operations of FIGS. 8, 9A, 9B, 10, 11 and 12, as discussed further below, to carry out the system manager application of the application framework 610. The CPU 652 may also suitably perform the operations of FIG. 13, discussed further below.

Before discussion of the specific operations of the system 600 of FIGS. 6 and 6A, the general operation of the system 550 will be described. In the general operation of the system 550, the comfort system devices 602 operate to provide heating, ventilation and air conditioning to the building in accordance with normal practices using any suitable conventional techniques. Similarly, the life safety devices 604 operate to provide monitoring for, and if necessary, notification of, a hazardous condition such as fire, smoke or toxic gas release. Finally, security system devices 606 operate to provide motion sensing, video surveillance information, and door position monitoring, and the like in accordance with normal security system practices.

In general, the CPU 652 employs the data server 624$_1$ to exchange data with at least some of the devices 602, 604 and 606 (directly or indirectly) via the interface stack software 629 and network I/O units 654$_1$ . . . 654$_r$. The CPU 652 maintains the system database 624$_2$ based on, among other things, the received data from the devices 602, 604 and 606. In another aspect of operation, the CPU 652 conveys command values from various elements in the management system 600 to the various devices 602, 604, 606, also via the interface software 629 and network I/O units 654$_1$ . . . 654$_r$. For example, by executing various scheduling scripts 1515 via the control manager 628, the CPU 652 may communicate scheduled commands to various devices 602, 604 and 606 via the interface stack software 629 and the network I/O units 654$_1$ . . . 654$_r$.

Figure 8:
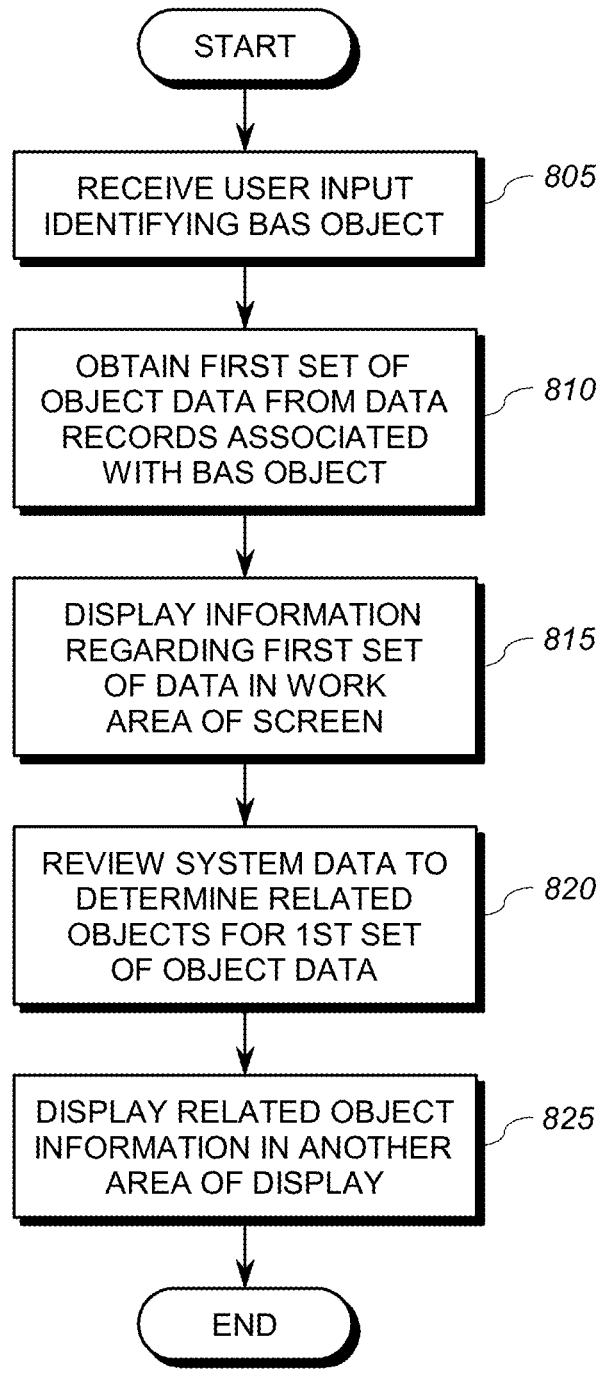
FIG. 8 illustrates a flow diagram of an exemplary set of operations executed by a processing unit as part of the graphical user interface function.

FIG. 8 shows in general terms a process flow of an exemplary set of operations of the CPU 652 executing the user interface application framework 610. FIGS. 9A, 9B, 10, 11 and 12, discussed further below, show in further detail how the operations of FIG. 8 may be carried out.

Referring to FIG. 8, in step 805, the CPU 652 receives a user input signal identifying a first of the plurality of building automation system objects to be displayed. For example, the CPU 652 may receive a selection from a plurality of selectable objects in the selection area 715 of FIG. 7 or FIG. 7A. Thereafter, the CPU 652 obtains a first set of object data regarding the selected building automation system object from one or more object data records associated with the first building automation system object. To this end, the CPU 652 may suitably obtain configuration data for the selected object (i.e. object data records 1605, 1610 of FIG. 16) from the configuration object data 1530 of the database 624$_2$, and obtain system values 1505 (see FIG. 15) related to the selected object from the database 624$_2$. The first set of object data may suitably include selectable links to other objects, such as child objects of the selected object. For example, if the select object is a floor of a building, the first set of building data may include a graphic for that floor, and links to temperature sensors located on that floor. Once the first set of object data is obtained, the CPU 652 thereafter proceeds to step 815.

In step 815, the CPU 652 displays (via the display 656) information regarding the first set of object data in the primary work area 720 of the display. By way of example, the CPU 652 may suitably display a graphic depicting or representing the object, or values associated with the object, in the primary work area 720 of FIG. 7. For example, in the example of FIG. 7A, the CPU 652 displays a graphic of the selected object room 002.

In addition, in step 820, the CPU 652 reviews system data, including dynamic data, to determine a set of related objects corresponding to one or more elements of the first set of object data. For example, the CPU 652 may review schedule files or other files to determine whether any schedules implicate or relate logically to the selected building automation system object, or some child object of the selected building automation system object. The CPU 652 may execute step 820 contemporaneous to, before, or after step 815.

After step 820, the CPU 652 executes step 825. In step 825, the CPU 652 displays information regarding the set of related objects in another portion of the display, while the information in the primary work area remains displayed. For example, referring to FIG. 7A, the CPU 652 may display selectable icons for the related objects in the related items area 730 while the graphic 722 remains displayed in the primary work area 720.

The above steps provide a functionality in which the user not only receives information relevant to a selected building automation system object, but further receives icons identifying selectable additional objects. Related items may be identified from the related items property <RI> of the object configuration data 1530 (see FIG. 16). Moreover, the related items may be dynamically determined based on system data, such as schedules, reports or the like. This provides the user with more options to navigate intuitively through the system 600.

Figure 9A:
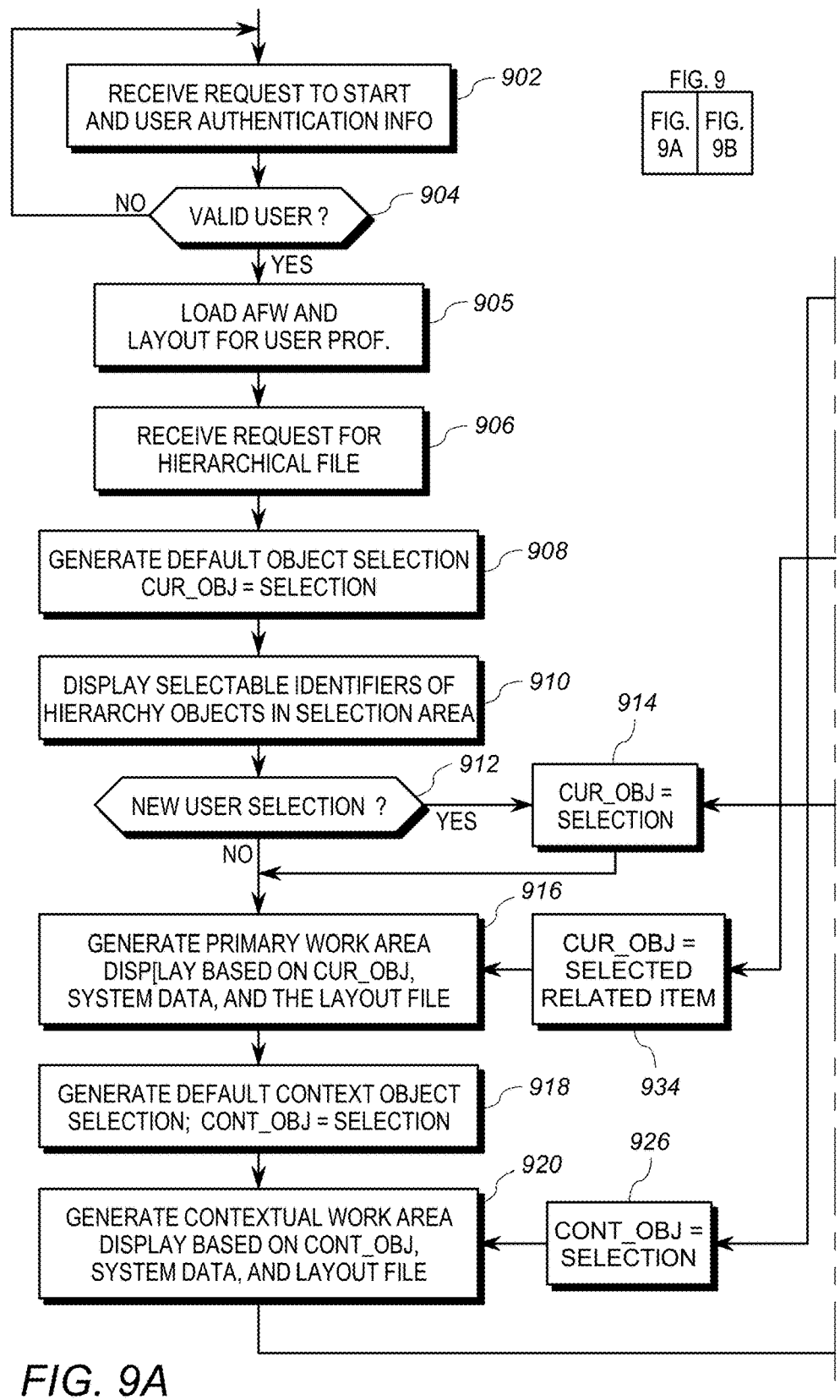
FIGS. 9A and 9B illustrate in further detail a first embodiment of the operations of FIG. 8 executed by a processing unit as part of the graphic user interface function.
Figure 9B:
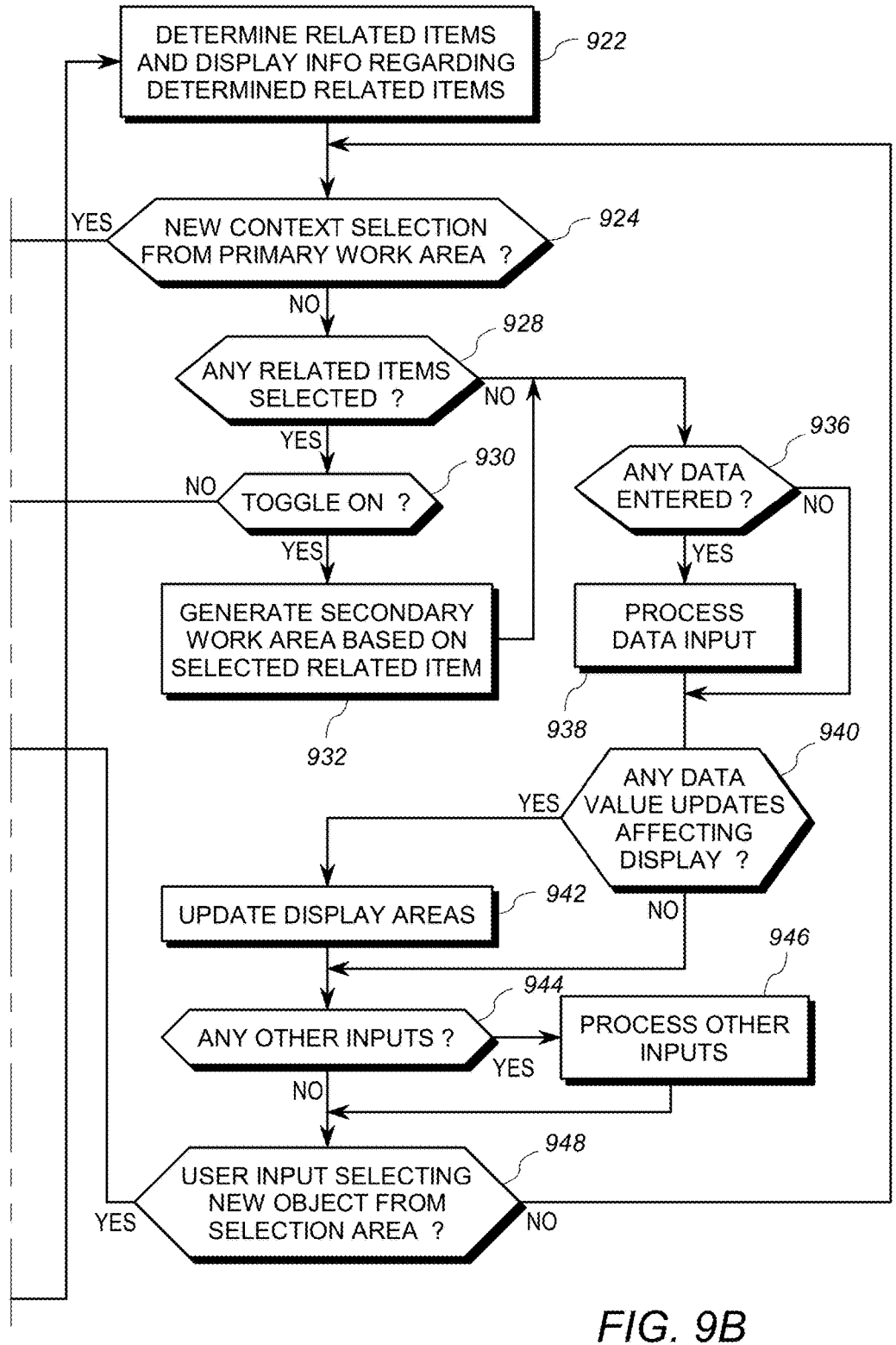

FIGS. 9A and 9B show in further detail an exemplary embodiment of the operations of FIG. 8. Initially, the CPU 652 in step 902 receives a request to start the application framework 610 via the user input 658. The request input includes user login information, such as name and password or other authentication information. The CPU 652 determines whether the user authorization value is valid. If not, the CPU 652 terminates operations of FIG. 9, or returns to step 902 to prompt for a new request. However, if the CPU 652 determines that the user authorization level corresponds to the required authorization value, then the CPU 652 proceeds to step 905.

In step 905, the CPU 652 instantiates the application framework 610 as an operating execution sequence. To this end, CPU 652 obtains the layout file 618 for the user from the corresponding user profile 1520. This user profile 1520 for the user identifies the snap-ins $1720_1 \ldots 1720_m$ for the various windows 702, 704, 705, and for the various areas 715, 720, 725, 730 and 735 of the window 702. As discussed above, different user profiles may identify different snap-in tools for each of the windows and areas, and the same snap-in tools may be identified for multiple of the areas. The CPU 652 then continues (via the main executable 617) in step 906.

In step 906, the CPU 652 receives, via the user input 658, a request to review a specific system or hierarchy file 1525 (see FIG. 15). To this end, the CPU 652 obtains the selected hierarchy file 1525 from the database $624_2$. For example, the user may request to retrieve a geographical hierarchical file of a specific building campus, such as the one illustrated in the selection area 715 of FIG. 7A. Accordingly, in one example, a first of the hierarchy files 1525 may define a geographical hierarchy, such as the hierarchy shown in the selection area 715 of FIG. 7A. A second of the hierarchy files 1525 may define a mechanical hierarchy, for example, corresponding to the flow path of chilled or heated air or water through the system 550. In such a mechanical hierarchy, for example, a "building" object may be associated with several "child" air handling unit objects. Each of the air handling units may in turn be associated with a plurality of "child" objects for ventilation dampers. Other hierarchies may be defined for any given building automation system, and would be a matter of design choice. In this embodiment, the user may in some cases select from a plurality of defined hierarchy files 1525 that include any or all of the data objects, including but not limited to those associated with building spaces and automation system devices 602, 604 and 606.

It will be appreciated that the user in this embodiment is limited to a set of hierarchies based on the user's authorization level.

Referring again to FIG. 9A, the CPU 652 in step 908 generates a default object selection value for generation of the initial display. The default object selection value can identify one of the objects of the selected hierarchy. The default value may suitably comprise the highest object in the selected hierarchy. In other cases, the CPU 652 sets the default object selection value to null, in which case, object information is displayed until a user choice is made. In either event, the selection value CUR_OBJ is set equal to the generated default object selection value.

In step 910, the CPU 652 displays, in the selection area 715 of the display screen 700 on the display 656, the hierarchy defined by the selected hierarchy file 1525. Using standard graphic user interface techniques, the CPU 652 also enables each of the objects identified on the displayed hierarchy to be selectable using the user input 658. For example, the CPU 652 allows the user to select any of the list items of the hierarchical list 718 of FIG. 7A. It will be appreciated that to execute step 910, the CPU 652 employs the rules 619 to cause the selection area 715 to display the hierarchical information in the hierarchical file 1525 using the identified snap-in $1720_x$ for the selection area 715 as defined in the layout file 618 (See. FIGS. 7, 15 and 17).

Thereafter in step 912, the CPU 652 determines whether it has received an input from the user input device 658 identifying a new user selection in the selection area 715. If so, then the CPU 652 proceeds to step 914. If not, then the CPU 652 proceeds directly to step 916. In step 914, the CPU 652 sets CUR_OBJ equal to the user selection. After step 914, the CPU 652 proceeds to step 916.

In step 916, the CPU 652 populates the primary work area 720 of the display screen 700 based on current object CUR_OBJ, the layout file 618, and system data from the database $624_2$. As discussed above, the graphic and/or text information presented in the work area 720 can have several different types of appearance, ranging from a graphic with or without interactive elements, sets of values with dialog boxes for changing the values, selectable text icons within selectable drop down menus, simple text lists or tables, pdf image documents, and/or live video feed. The display format is determined by the layout file 618 (see FIG. 17), and in particular, the one or more snap-in tools $1720_x$ identified within the layout file for the primary work area 720. While the snap-in tools $1720_x$ define the format of the display, such as graphical, textual, video, and/or arrangements of pull-down menus and dialog boxes, the content or values within the display element depend on configuration data and/or system data (from the system data $624_2$).

Figure 10:
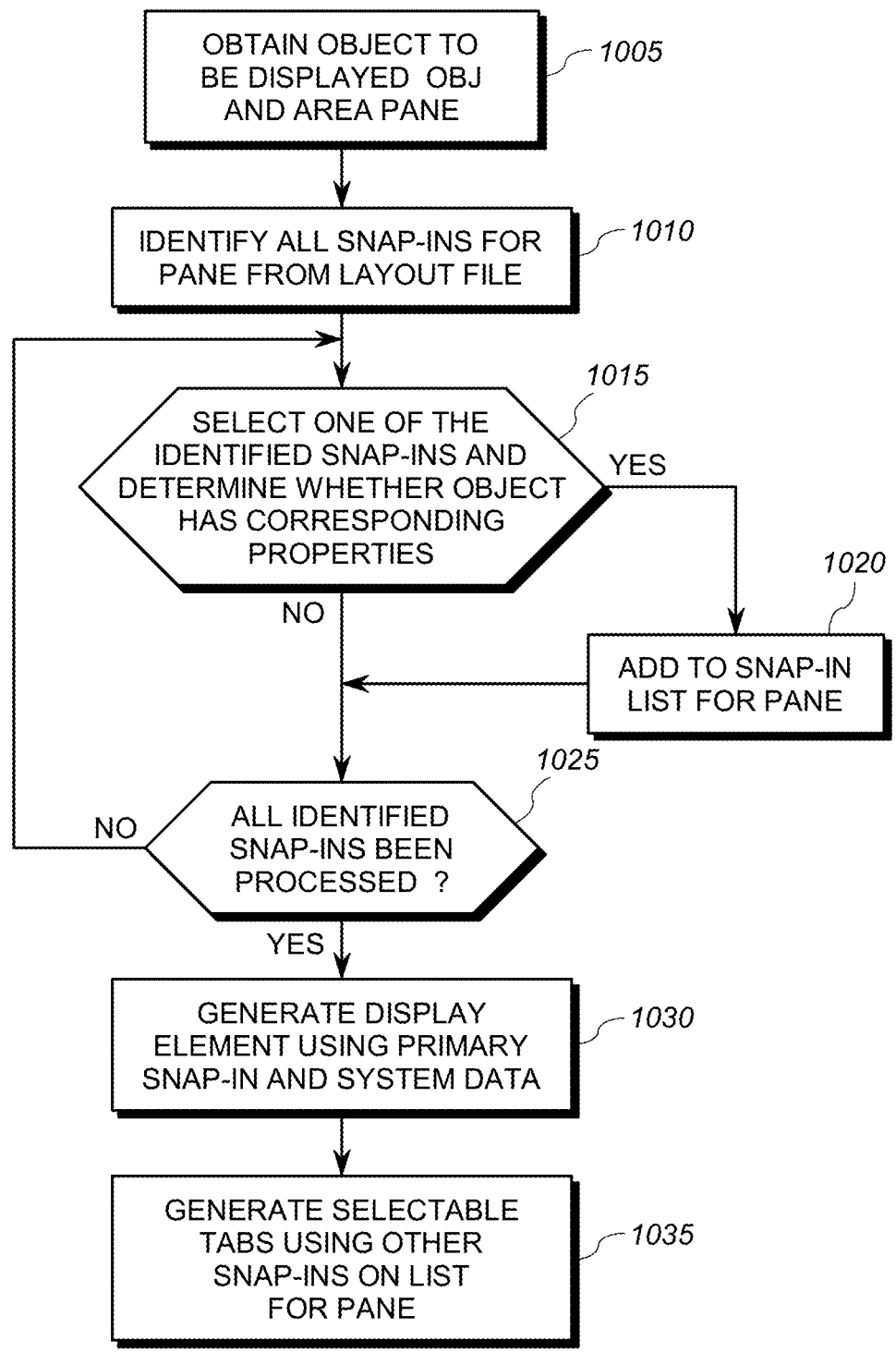
FIG. 10 illustrates a flow diagram of an exemplary set of operations that may be executed by a processing unit to generate a display element within the operations of FIGS. 9A, 9B.

In particular, FIG. 10 shows in further detail a set of operations employed by the CPU 652 to generate the display element in any window or work area, such as in the primary work area 720. As will be noted below, the CPU 652 employs the same set of operations to generate the display element of the contextual work area 725 and the secondary work area 735, discussed further below.

Referring briefly to FIG. 10, the CPU 652 in step 1005 obtains the object selection to be displayed, OBJ, and an identification of the window/area, PANE, in which it is to be displayed. In the case of step 916, the object selection OBJ will be set equal to CUR_OBJ, and the value PANE is equal to the primary work area 720. In the case of step 922, discussed further below the object selection OBJ in step 1005 will be set equal to CONT_OBJ, and PANE will be set to the contextual work area 725. In the case of step 932, also discussed further below, the object selection OBJ in step 1005 will be set equal to the selected related object, and PANE will be set equal to the secondary work area 735.

In any event, in step 1010, the CPU 652 references the layout file 618 to determine all snap-in tools $1720_x \ldots 1720_y$ that are identified for the current area being generated or populated. Consider an example wherein PANE is the primary work area 720, and wherein the area definition $1710_1$ of the layout file 618 of FIG. 17 corresponds to the primary work area 720. In such a case, the CPU 652 would determine (based on the definition $1710_1$) that snap-in tools $1720_1$, $1720_2$, and $1720_3$ are to be used to generate the display elements of the primary work area 720.

Once the snap-in tools $1720_x$ identified in the area definition $1710_x$ corresponding to the area PANE have been identified, the CPU 652 then processes each of the identified snap-in tools in steps 1015 to 1025.

In step 1015, the CPU 652 determines, for one of the identified snap-in tools 1720$_x$, whether the object OBJ has properties or data appropriate for the snap-in tool definition. To this end, it will be appreciated that all objects do not have properties or data appropriate for all display formats. For example a snap-in tool 1720$_x$ may be a video image output. If the object OBJ is a room object for a room having a video camera, then the CPU 652 would determine that snap-in tool 1720$_x$ was appropriate for the object OBJ. If, however, the object OBJ is a temperature sensor, then CPU 652 may determine that the snap-in tool 1720$_x$ is not appropriate for the object OBJ. In most cases, step 1015 may be carried out by determining whether the configuration object data record for the object OBJ has properties expected by the snap-in tool.

Referring generally to step 1015, if the CPU 652 determines that the object OBJ has properties appropriate for the select snap-in tool 1720$_x$, then the CPU 652 proceeds to step 1020. If not, then the CPU 652 proceeds to step 1025.

In step 1020, the CPU 652 adds the snap-in tool 1720$_x$ to the list of snap-in tools to be executed in generating the display area for PANE. Thereafter, the CPU 652 proceeds to step 1025. In step 1025, the CPU 652 determines whether all snap-in tools identified in the layout file 618 corresponding to the area PANE have been processed. If so, then the CPU 652 proceeds to step 1030. If not, then the CPU 652 returns to step 1015 to process another of the snap-in tools identified in step 1010.

In step 1030, the CPU 652 generates a display element for the area PANE (e.g. primary work area 720, contextual work area 725 or related items area 730) using the primary snap-in tool on the generated list (step 1020) of snap-in tools. In particular, although multiple snap-in tools may be on the generated list for the display in the area PANE, the CPU 652 only displays one of the snap-in tools. To this end, the layout file 618 further includes a prioritization of snap-in tools appropriate for each window or area. As a default, the snap-in tool on the generated list of snap-in tools with the highest priority constitutes the primary snap-in tool. In step 1030, the CPU 652 employs the primary snap-in tool and the properties of the object OBJ to generate a display element in the area PANE. Further detail regarding the generation of a display element as per step 1030 is provided below in connection with FIG. 11. After step 1030, the CPU 652 proceeds to step 1035.

In step 1035, the CPU 652 causes a selectable tab (e.g. 724$_1$ and 724$_2$ of FIGS. 7 and 7A) to be displayed in the area PANE (e.g. area 720) for all other identified snap-in tools on the list generated in step 1020. Such tabs (e.g. 724$_1$, 724$_2$) allow the user to select another display format for the same display area PANE and the same object OBJ. For example, while the primary work area 720 of FIG. 7A shows a floor plan graphic 722 of the object Room_002, the user may select the icon 724$_2$ to display a text description of the object Room_002.

To this end, at any time such a tab is selected, the CPU 652 sets the primary snap-in tool equal to that corresponding to the selected tab, and executes again steps 1030 and 1035. In this manner, the user is made aware of available, alternative display formats for properties and/or values of the object OBJ in the relevant area/window PANE.

Figure 11:
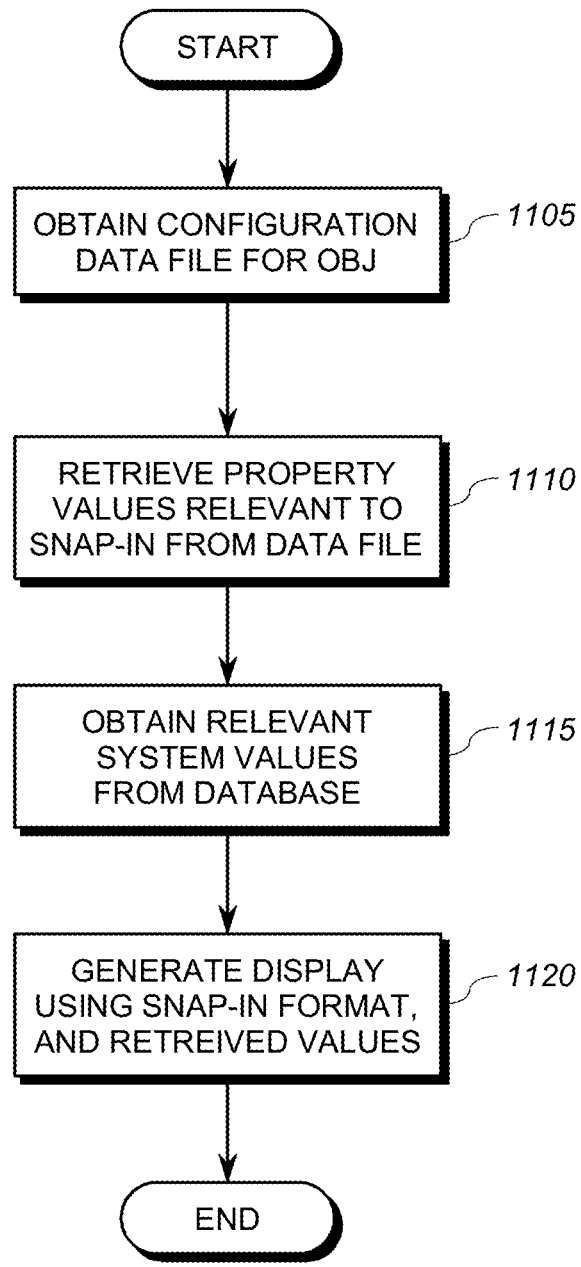
FIG. 11 illustrates in further detail a set of operations performed by a processing unit to carry out one of the operations of FIG. 10 in a first embodiment.

FIG. 11 shows an exemplary operation of the CPU 652 in generating a display element for an object OBJ using a snap-in tool 1720$_x$. The operations of FIG. 11 are generalized for all snap-in tools.

Referring now to FIG. 11, in step 1105, the CPU 652 executing a snap-in tool 1720$_x$ obtains the object object data record (e.g. object data record 1605 or 1610 of FIG. 16) from the database 624$_2$ for the object OBJ. In step 1110, the CPU 652 retrieves from the object object data record any static properties to be used in generating the display. To this end, each snap-in tool 1720$_x$ references a set of property types used by various data objects in the system. In step 1115, the CPU 652 retrieves the property values of OBJ for the property types required by the particular snap-in tool 1720$_x$. For example, if the snap-in tool requires the associated graphic (if any) property of the object OBJ, then in step 160, the CPU 652 obtains whatever value, link or other information is stored in the <graphic> property of the object data record 1605 or 1610 (see FIG. 16) for the select object OBJ.

In step 1115, the CPU 652 retrieves from the database 624$_2$ any dynamic operating data required by the snap-in tool 1720$_x$ that corresponds to the selected object OBJ. For example, if the object OBJ were a temperature sensor, then the CPU 652 in step 165 may suitably retrieve from the database 624$_2$ (via a reference within the object object data record) the temperature value sensed by the corresponding physical sensor.

Once the CPU 652 has all of the information for the display element (i.e. the graphics and/or text to be displayed in the primary work area 720) that will be generated by the snap-in 1720$_x$, the CPU 652 in step 1120 generates the actual display element using the retrieved configuration data and retrieved operating data. As discussed above, the generated display element may be a graphic, a text table, an interactive set of text and pull-down menus, or any typical interactive screen elements.

Accordingly, the steps of FIGS. 10 and 11 present one way in which step 916 of FIG. 9A (as well as any steps involving populating an area of the display 700) may be carried out. The generation/population of other display areas is carried out in an analogous manner.

Returning again to FIG. 9A, once the display element for the primary work area 720 has been generated, the CPU 652 proceeds to step 918. In step 918, the CPU 652 determines a default object selection for the context work area 725. In particular, as discussed above, the context work area 725 provides select additional information regarding the selected object CUR_OBJ from the selection area 715. Moreover, most displays in the primary work area 720 include additional links or selectable icons to other objects, such as "child" objects, or contained objects, of the selected object. The CPU 652 causes such "child" objects to be selectable within the primary work area 720. Icons 711$_1$ and 711$_2$ of FIG. 7 illustrate examples of such selectable object icons. In such cases, the user may select additional information (drill down) by selecting the object icon or link within the primary work area 720.

Consider an example wherein the selected object CUR_OBJ is a room, and the display element in the primary work area 720 includes selectable icons or text boxes identifying sensors and actuators within that room. The user may select one of the sensors or actuators within the primary work area 720 in order to obtain additional information regarding the sensor in the contextual work area 725. This object selected within the primary work area 720 by the user is referred to herein as the contextual object, CONT_OBJ.

However, prior to any user selection of a contextual object, the CPU 652 determines a default contextual object CONT_OBJ to display in the contextual work area 725. Accordingly, in step 918, the CPU 652 determines this default contextual object CONT_OBJ based on the selected object CUR_OBJ and the snap-in program 1720$_k$ used for the generation of the display element in the primary work area 720.

After step 918, the CPU 652 executes step 920. In step 920, the CPU 652 populates the contextual work area 725 of the display screen 700 based on the current contextual object CONT_OBJ, the layout file 618, and system data from the database 624$_2$. Similar to the primary work area 720, the graphic and/or text information presented in the contextual work area 725 can have several different types of appearance, ranging from a graphic with or without interactive elements, sets of values with dialog boxes for changing the values, text with selectable drop down menus, simple text lists or tables, pdf image documents, and live video feed. As in step 916, the display element type within the contextual work area 725 depends on the object selected (CONT_OBJ) and the layout file 618 obtained from user profile 1520. The content and values within the display element in the contextual work area 725 depend on configuration data and/or system data (from the data image 624$_2$). To generate the contextual work area display in step 920, the CPU 652 carries out the operations of FIGS. 10 and 11, similar to step 918.

After step 920, the CPU 652 executes step 922. In step 922, the CPU 652 determines the related items for the related items area 730 based on the contextual object that has been selected from within the primary work area 720, in other words, the object CONT_OBJ. The CPU 652 furthermore displays information and/or links corresponding to the determined related items. To this end, the CPU 652 preferably carries out the operations of FIG. 12. However, as general matter, the CPU 652 identifies the related items as items that bear a relationship to the object CONT_OBJ.

In the embodiment described herein, the related items include any schedules on which points or data values of the object CONT_OBJ appear, any existing reports for the CONT_OBJ, and new reports for the object CONT_OBJ. To this end, the related items include static elements listed in the properties of the object configuration data for the object CONT_OBJ such as existing reports, calendars or video cameras images that may be predefined associated with the object CONT_OBJ, as well as dynamic elements such as schedules generated in subsystems of devices 602, 604, 606 and other non-property elements involving CONT_OBJ that may be discovered by the management system 600 during operation and assigned as a related item to the object CONT_OBJ.

After step 922, the CPU 652 proceeds to step 924. In step 924, the CPU 652 determines whether the user has provided, via the user input 658, a new selection of an object from within the primary work area 720. In other words, the CPU 652 determines whether it has received an input identifying a new contextual object. As discussed above, the primary work area 720, which displays information about CUR_OBJ, displays selectable icons or links to further information regarding CUR_OBJ, such as "child" objects or related files. Such objects are typically defined or referenced in the configuration properties of the data object CUR_OBJ. In step 924, the CPU 652 determines whether it has received an input selecting a link or icon from the primary work area 720.

If so, then the CPU 652 proceeds to step 926. If, however, the CPU 652 does not detect a new input selecting a link or icon from the primary work area 720, then the CPU 652 proceeds to step 928, discussed further below. In step 926, the CPU 652 sets CONT_OBJ equal to the new selection.

After step 926, the CPU 652 returns to steps 920 and 922 in order to update the contextual work area 725 and related items area 730 accordingly.

Referring to step 928, the CPU 652 determines whether any of the related items has been selected from the related items area 730. If not, then the CPU 652 proceeds to step 936 to determine whether other inputs have been received. If so, however, then the CPU 652 proceeds to step 930 to process the selected related item.

In step 930, the CPU 652 first determines whether a selected toggle/button is in the "on" state. The selected toggle/button is a user graphic control (see toggle graphic control 738 of FIGS. 7 and 7A.) that allows the user to dictate whether information pertaining to a selected related item is to be displayed in the primary work area 720 or the secondary work area 730. If the CPU 652 determines that the toggle/button 738 is in the on-state, then proceeds to step 932. If not, then the CPU 652 proceeds to step 934.

In step 932, the CPU 653 populates the secondary work area 735 with information related to the selected related object. Similar to the generation of displays of other objects, such as CUR_OBJ and CONT_OBJ, the CPU 652 in step 932 performs the operation of FIGS. 10 and 11 to populate the secondary work area 735. After step 932, the CPU 652 proceeds to step 936.

By contrast, in step 934, the CPU 652 sets CUR_OBJ to the selected related item. The CPU 652 thereafter returns to step 916 to display information related to the newly defined CUR_OBJ within the primary work area 720. The CPU 652 thereafter proceeds as described above after step 916.

Referring now to step 936, the CPU 652 determines whether any user input data has been received (via input device 658) in any of the work areas, such as the primary work area 720, the secondary work area 735, and the contextual work are 725. If so, then the CPU 652 proceeds to step 938. If not, then the CPU 652 proceeds to step 940. In step 938, the CPU 652 processes the input. If the input relates to a commanded point, such as a temperature set point, a camera control, or other command value, then the CPU 652 provides the value to the data image 624$_2$. It will be appreciated that the data server 624$_1$ thereafter causes the command value to be forwarded to the appropriate device of the devices 602, 604 and 606 via the interface 629. If the input relates to some other function, such as a schedule or report, the CPU 652 causes the relevant object data record relating to said schedule or report is updated. Other methods of processing input data relating to building automation systems may readily be implemented.

Figure 19:
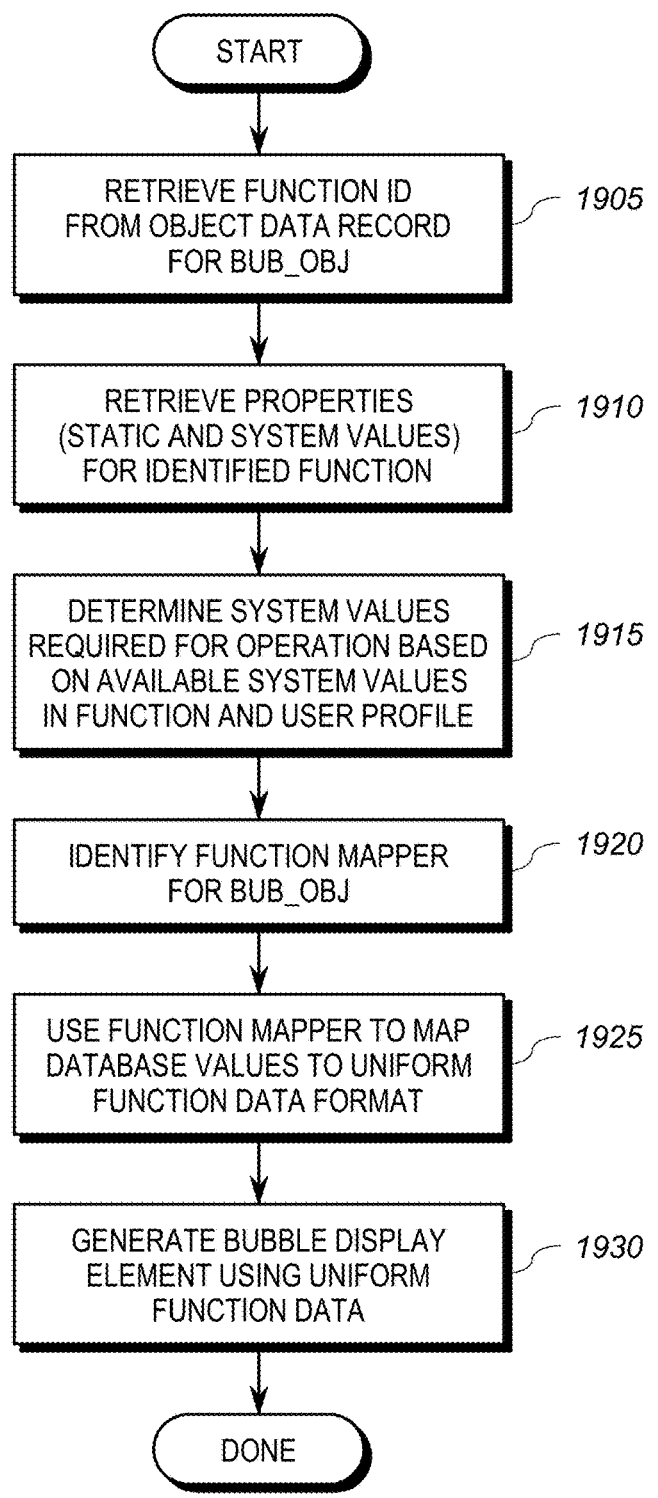
FIG. 19 shows a flow diagram of an exemplary set of operations of a processing unit performing an operation of the flow diagram of FIG. 18.
Figure 20:
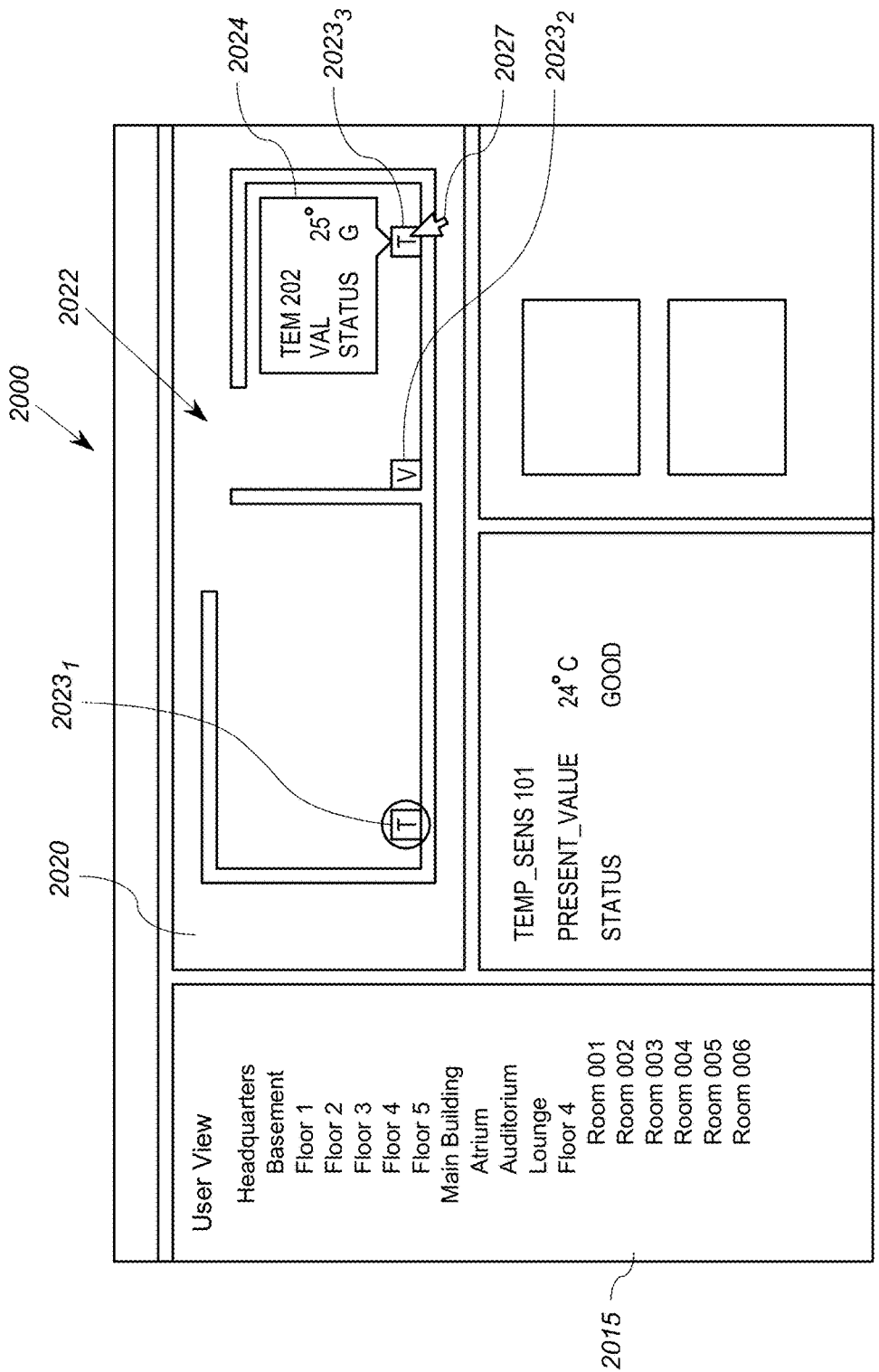
FIG. 20 shows an exemplary graphic display according to an embodiment of the invention including an exemplary of a floor plan graphic of two rooms.

For example, one such other input relates to a cursor rollover function. Specifically, at least some graphic elements in this embodiment enable a cursor rollover function in which a small informational bubble pops up on the display 656 when the user rolls a mouse pointer over a selectable item within the graphic. The small informational bubble contains further information regarding the object represented by the selectable icon. For example, referring to FIG. 20, the exemplary graphic display 2000 shown therein includes within the primary work area 2020 a graphic 2022 of a floor plan of two rooms. Within the graphic 2022 are three selectable icons 2023$_1$, 2023$_2$, and 2023$_3$, representative of temperature sensor objects and a ventilation damper object located within the rooms. Also shown in FIG. 20 is a conventional cursor 2027, the position of which may be manipulated by the user input device 658, for example, a mouse or other pointing device. If a user generates an input moving the cursor 2027 over any of the icons 2023$_1$, 2023$_2$, and 2023$_3$, then an information bubble pops up in the vicinity of the rolled over icon. In the example of FIG. 20, the user has rolled the cursor 2027 over the icon 2023$_3$, and the CPU 652 has caused the bubble 2024 to pop up. Further detail regarding such an operation is provided further below in connection with FIGS. 18 and 19.

Referring again generally to FIG. 9, after processing the input in step 938, the CPU 652 proceeds to step 940.

In step 940, the CPU 652 determines whether any updates have been received to the information displayed in any of the areas 720, 725 and 735. In particular, because some of the data displayed in the areas 720, 725, and 735 may comprise or relate to active sensors, cameras or controlled devices (of the devices 602, 604, 606), the outputs of such devices can change. Such changes propagate to the database 624$_2$, as well as to various reporting functions and other software programs (e.g. software extension 626$_1$ . . . 626$_p$ and/or control manager 628). The CPU 652 obtains notification of any changes to values displayed (or affecting the appearance of) any of the display elements in the area 720, 725 and 735. If the CPU 652 determines that a relevant value has changed, then the CPU 652 executes step 942. If not, then the CPU 652 proceeds directly to step 944.

In step 942, the CPU 652 refreshes or updates the display elements in the areas 720, 725 and 735 using any changed values. To this end, the CPU 652 may simply perform the operations of FIGS. 10 and 11 for each of the areas 720, 725 and 735. After step 942, the CPU 652 proceeds to step 944.

In step 944, the CPU 652 determines whether any other inputs received via the user input device 658 need to be processed. To this end, it will be appreciated that the display screen 700 may suitably include multiple other selectable features that enhance the utility of the display screen 700. Such features may take a plurality of formats. Such features can include selectable tabs (e.g. 724$_1$ and 724$_2$) for each of the work areas 720, 725 and 735, which allow the user to select from among a plurality of display formats (corresponding to appropriate snap-in tools) for the relevant object in each work area. Other examples can include inputs generating a contextual work area, not shown, for the secondary work area 735. If such other inputs have been received, then the CPU 652 proceeds to step 946 to process the inputs in an appropriate manner. The CPU 652 thereafter proceeds to step 948. If no other inputs have been received, then the CPU 652 proceeds directly to step 948.

In step 948, the CPU 652 determines whether the user has selected a new selection from the selection area 715. If so, then the CPU 652 proceeds to step 914 to set CUR_OBJ to the new value. As discussed above, the CPU 652 after step 914 executes step 916 and proceeds accordingly. If, however, the CPU 652 determines in step 948 that it has not received a new selection from the selection area 715, then the CPU 652 returns to step 924 and proceeds accordingly.

Figure 12:
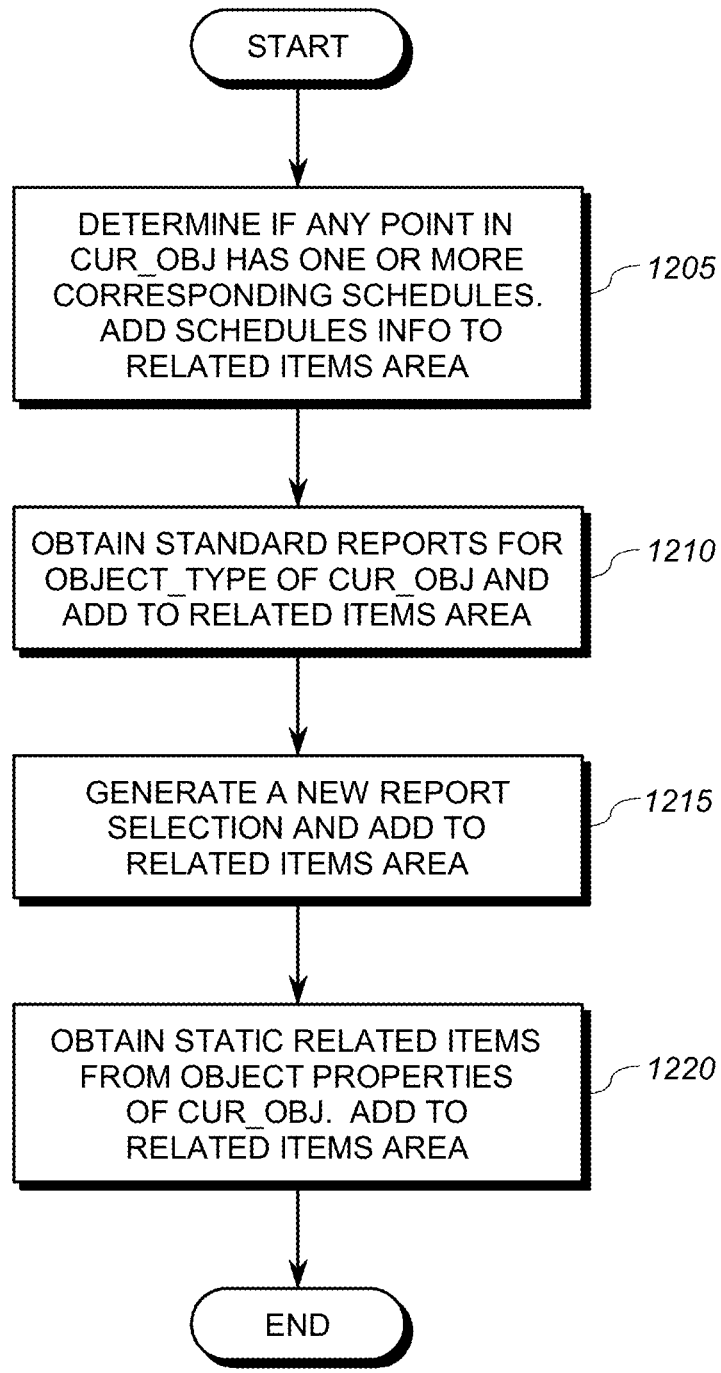
FIG. 12 illustrates a flow diagram of an exemplary set of operations that may be executed by a processing unit to generate related item information for display in accordance with the operations of FIGS. 9A and 9B.

As discussed above, one of the features of the operations of FIGS. 9A and 9B is the determination of the related items for a selected object within the primary work area 720, and the display of selectable icons or other information corresponding thereto, in the related items area 730. FIG. 12 shows an exemplary set of operations that may be performed by the CPU 652 in determining the related items corresponding to the object CONT_OBJ, represented as step 922 of FIGS. 9A and 9B.

In step 1205, the CPU 652 determines all the schedule files that include any points identified with or associated with the CONT_OBJ. To this end, as discussed further above in connection with FIG. 16, each data object data record 1605, 1610 may have associated with it points or active system data values. Such points may include control points, such as set points or other command values, that are adjusted according to one or more schedules defined by a schedule file. A schedule file can include the schedule files 1515 in the database 624$_2$, or can include schedules executing separately on one or more controller devices of the devices 602, 604 and 606.

In step 1205 the CPU 652 determines all schedules associated with the point properties of the selected contextual object CONT_OBJ and displays information, such as a selectable icon, representative of those schedules in the related items area 730.

To this end, the CPU 652 reviews a stored output file (in the data model 624$_2$) that lists all schedule files associated with each point of the system 550. In the embodiment, described herein, the stored output file is a table of points. The table entry for each point lists a set of schedule files that correspond to the point.

For example, FIG. 14 shows an exemplary relationship finder output file. In that output file, which may suitably be stored in the primary memory 660 of the system 600, three points TEMP_SP_03, TEMP_SP_08 and CHILL_PWR are listed at table entries. For each of the table entries, there is a set of schedule identifiers, some subset of identifies SCH. 1, SCH. 2, SCH. 3, and/or SCH. 4, that affect the point or value in question.

Referring again to FIG. 12, in step 1205, the CPU 652 determines the schedules listed in the stored output file for all point properties of the CONT_OBJ. The CPU 652 furthermore causes the related items area 730 to include selectable icons to links to such schedules.

Thereafter, in step 1210, the CPU 652 generates a link to new standard reports for the CONT_OBJ base on the object type of the CUR_OBJ. In particular, each object type has a set of predetermined standard reports, for example, trend reports, that can maintained by system 600. The CPU 652 identifies the standard reports for the CONT_OBJ based on its object type. The CPU 652 furthermore causes the related items area 730 to include selectable icons to links to new standard reports. The user may subsequently select such icons to set up new reports involving the object CONT_OBJ.

Thereafter, in step 1215, the CPU 652 causes a selectable icon to a link to a new, identified report selection to be displayed in the related items area 730. The user may select this icon to generate some other report involving the object CONT_OBJ.

In step 1220, the CPU 652 identifies and displays information for any static related items for the object CUR_OBJ. Specifically, the CPU 652 determines static related items based on the object data record (e.g. 1605, 1610) for the object CONT_OBJ in the database 624$_2$. To this end, CPU 652 reviews a predetermined set of properties in the configuration data (i.e. the related items property <RI> of object data records 1605, 1610) for the CONT_OBJ to identify any static related items. These static properties can, for example, include a link to a video feed from a video camera, existing reports, and the like. The CPU 652 further causes the related items area 730 to include selectable icons to links to such static related items.

Thus, the operations of FIG. 12 show how the CPU 652 may generate selectable related items for an object already displayed in other areas 720 and/or 725. These related items include those defined as properties for the object, as well as those dynamically created based on system data (such as schedules) and/or to allow new objects (i.e. reports) to be generated.

Figure 13:
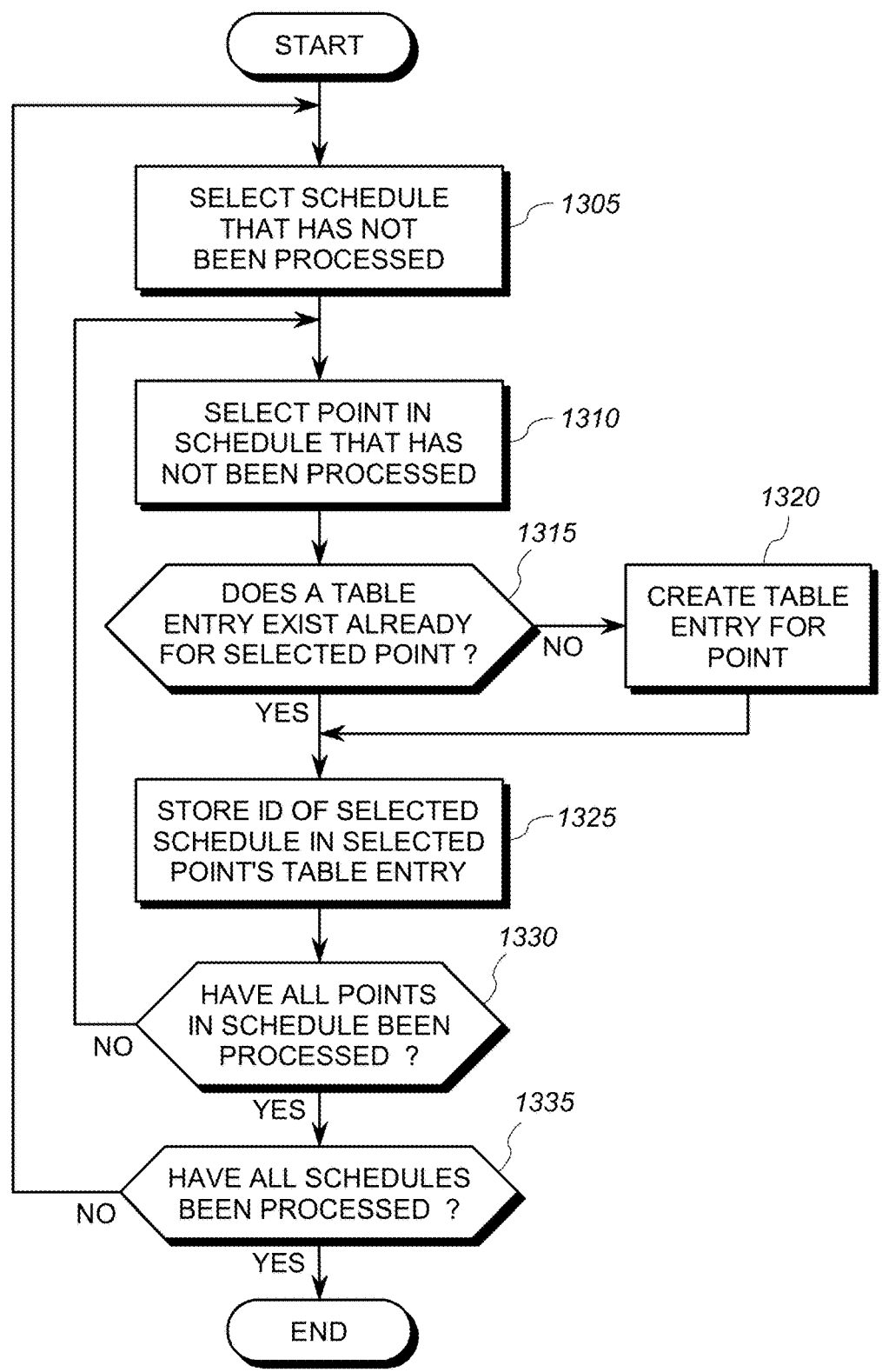
FIG. 13 illustrates a flow diagram of an exemplary set of operations that may be executed by a processing unit to determine relationships between objects within a building automation system.

FIG. 13, as discussed above, shows the operations that may be performed by the CPU 652 (or another processing unit) to dynamically (i.e., not pre-defined at startup) generate a relationship finder output file that relates data points to schedules. As discussed above, the relationship finder output file in this embodiment is a table of points. For each point in the table, a list of schedules that involve or relate to the point is stored. (See FIG. 14). The CPU 652 performs the steps of FIG. 13 to generate such a table.

In step 1305, the CPU 652 selects a schedule file from the schedule files 1515 that has not yet been processed. Alternatively, or in addition, the CPU 652 obtains one or more schedules maintained on controllers of the devices 602, 604 and 606. In step 1310, the CPU 652 selects a point that is identified within the selected schedule, and has not yet been processed. In step 1315, the CPU 652 determines whether a table entry exists for the selected object. If so, the CPU 652 proceeds directly to step 1325. If not, then the CPU 652 in step 1320 creates a table entry for the selected object, and then proceeds to step 1325.

In step 1325, the CPU 652 stores an identification of the selected schedule in the table entry for the selected point. In this manner, any subsequent look-up of the selected point (per step 1205 of FIG. 12) on the table will identify, among other things, the particular schedule currently being processed. After step 1325, the CPU 652 proceeds to step 1330.

In step 1330, the CPU 652 determines whether all points in the selected schedule have been processed. If so, then the processing of the selected schedule is complete and the CPU 652 proceeds to step 1335. If not, then the processing of the selected schedule is not complete and the CPU 652 returns to step 1310 to select and process another object of the selected schedule.

In step 1335, the CPU 652 determines whether all of the schedules maintained by the system 600 have been processed. If so, then the CPU 652 has completed the relationship finder output file and ends the process. If not, then the CPU 652 returns to step 1305 to select and process another schedule.

The above operations of FIG. 13 thus show how at least some dynamic related items are identified for subsequent display in the related items area 730 of FIG. 7. In accordance with the embodiment described herein, however, additional information related to child object, such as those represented by icons $711_1$ or $711_2$ of FIG. 7, may be generated by simply rolling a mouse cursor (e.g. cursor 2027 of FIG. 20) over the icon.

To this end, one of the "other inputs" that is detected and processed in step 946 is a rollover display operation. In the embodiment described herein, the rollover display operation is an additional feature in which when the cursor (e.g. cursor 2027) rolls over certain selectable graphic elements, such as selectable icons $711_1$ or $711_2$ of FIG. 7, or icons $2023_1$, $2023_2$, and $2023_3$ of FIG. 2A0, a small pop-up "bubble" appears with more information regarding the corresponding object. In addition, if the user selects the bubble or element (in a way that differs from the selection in step 924), then the system 600 provides a superimposed graphic element with further information and possibly dialog boxes or other controls for receiving command inputs. Further details regarding such operation are provided below in connection with FIGS. 18 and 19.

Figure 18:
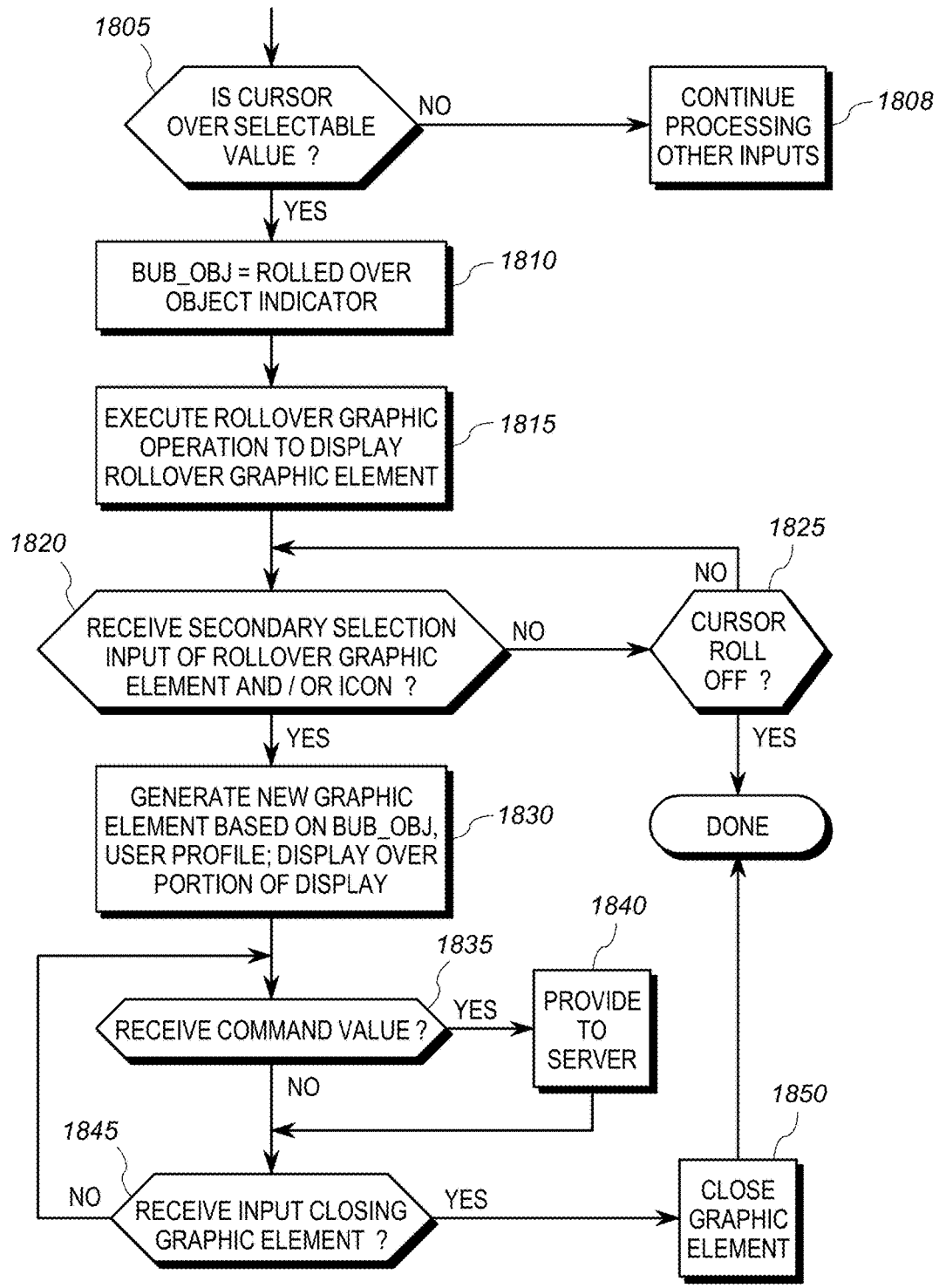
FIG. 18 shows a flow diagram of a set of operations of a processing unit in connection with another exemplary embodiment of the invention.

Specifically, FIG. 18 represents operations that may be enabled at any time a graphic element (e.g. element 722 of FIG. 7A or element 2022 of FIG. 20) includes a selectable icon, such as the icons $2023_1$, $2023_2$, and $2023_3$ of FIG. 20. In step 1805, the CPU 652 determines whether the user input device 658 has received a cursor position input that indicates that the cursor (e.g. cursor 2027) has rolled onto a child object icon (e.g. icons $2023_1$, $2023_2$, and $2023_3$) within a displayed graphic element. If not, then the CPU 652 in step 1808 returns to processing other inputs per step 946 of FIG. 9, and the operations of FIG. 18 are completed.

If, however, the CPU 652 has received an input from the input device 658 consistent with the cursor being rolled over a displayed icon, then the CPU 652 proceeds to step 1810. In step 1810, the CPU 652 sets the value BUB_OBJ to the object data record identifier associated with the icon that has been rolled over. Thus, in the example of FIG. 20, the CPU 652 sets BUB_OBJ equal to the identifier of the temperature sensor object data record (e.g. model 1605 of FIG. 16) associated with the icon $2023_1$. The identifier preferably includes an identifier of the object data record (e.g. object data records 1605, 1610 of FIG. 16) corresponding to the object over which the cursor 2027 has been positioned.

After completion of step 1810, the CPU 652 executes step 1815. In step 1815, the CPU 652 executes a bubble or rollover graphic operation in which a rollover graphic element is generated and displayed. The rollover graphic element includes limited information regarding the object that corresponds to the identifier BUB_OBJ. Such information may take the form of a small information box such as the rollover graphic element 2024 of FIG. 20. In accordance with this embodiment of the present invention, the rollover graphic element in step 1815 is generated using operations similar to that of FIG. 3, discussed further above. Specifically, in step 1815, the CPU 652 preferably creates an instance of a generic function using the data model identified by BUB_OBJ, uses the instance of the function to obtain values from the database $624_2$ relating to the data model, uses one or more function mappers to translate the value to a generic form that is employed as an output by the function definition, and then executes the graphic generating operation using the translated or mapped values from the instance of the function. FIG. 19, discussed further below, illustrates an exemplary set of operations that may be executed by the CPU 652 to carry out the operations of step 1815. By way of example, the result of step 1815 may suitably be the rollover graphic element 2024 of FIG. 20.

After the completion of step 1815, the CPU 652 executes step 1820. In step 1820, the CPU 652 determines whether the icon corresponding to BUB_OBJ has been selected for additional graphics using a secondary input that differs from the input expected in step 924 of FIGS. 9A and 9B. The second input received via the input device 658 must be distinguishable from the input received from the context object selection of step 924 of FIG. 9, because the different inputs cause the CPU 652 to perform different actions. In particular, as discussed above in connection with step 924 of FIG. 9, if the CPU 652 receives in input selecting an icon (e.g. icons $2023_1$, $2023_2$, and $2023_3$), then the CPU 652 provides additional information relating to the associated object in the contextual work area 725. By contrast, selection of the same icon in step 1820 causes the CPU 652 to display a superimposed graphic element as will be discussed below. To this end, for example, the input associated with step 924 of FIG. 9 may be an ordinary "left click" of a mouse in one of the Windows® operating systems available from Microsoft Corporation, and the input associated with step 1820 may suitably be an ordinary "right click" of the mouse. In systems that do not support right and left mouse button inputs, the input in step 1820 may suitably be a mouse-click while holding down a "shift" key, "control" key, "option" key or the like of a keyboard.

If the CPU 652 determines in step 1820 that it has received a secondary input selecting the icon corresponding to the value BUB_OBJ, then the CPU 652 proceeds to step 1830. If not, then the CPU 652 executes step 1825. In step 1825, the CPU 652 determines whether the cursor (e.g. cursor 2027) has been moved to a position that is off of the icon corresponding to the value BUB_OBJ. If so, then the process of FIG. 18 is complete, and the CPU 1825 returns to step 946 of FIG. 9 to process any other inputs and/or proceed accordingly. If the CPU 1825 does not detect that the cursor has been moved off of the icon corresponding to the value BUB_OBJ, then the CPU 652 returns to step 1820.

Figure 21:
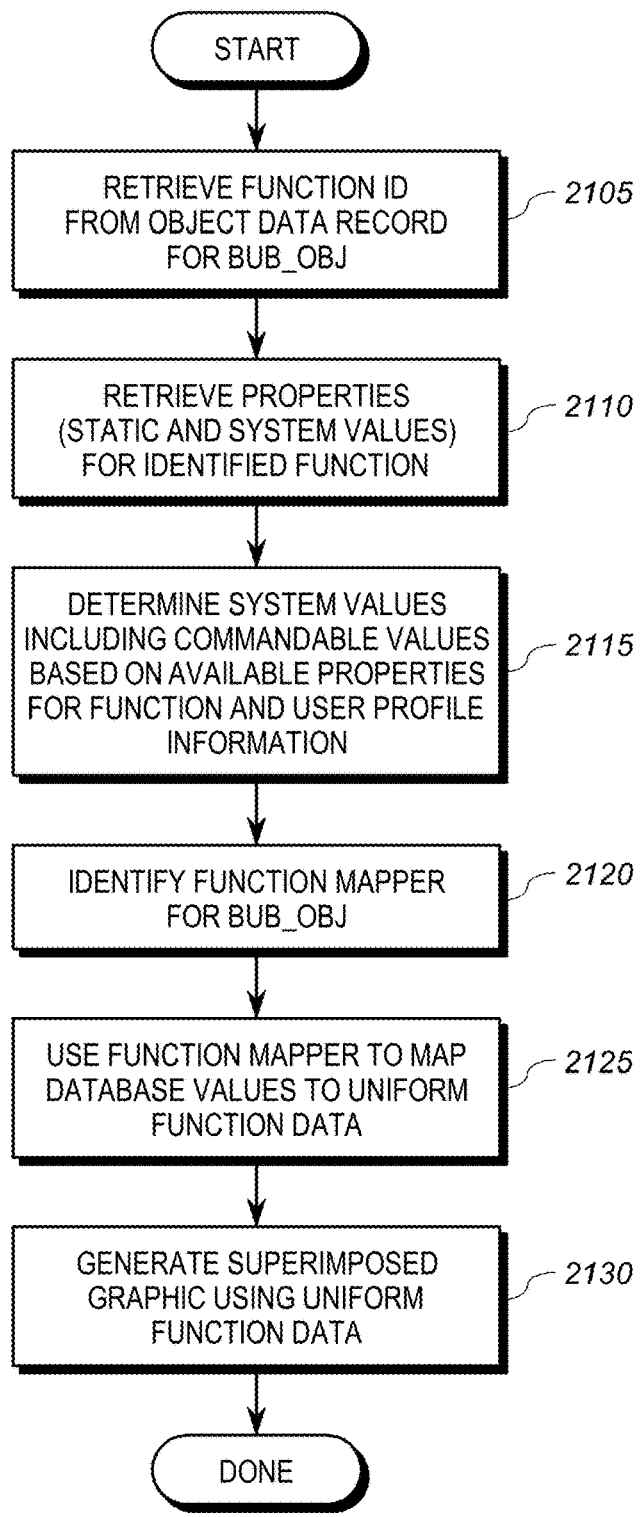
FIG. 21 shows a flow diagram of an exemplary set of operations of a processing unit performing an operation of the flow diagram of FIG. 18.

At 1830, the CPU 652 begins a process of generating a new graphic element that is to be displayed as an inlaid pop-up graphic. Specifically, in step 1830, the CPU 652 generates a pop-up graphic element using a substantially predetermined format, and based on values from the database 624$_2$ associated with BUB_OBJ, and the user's profile 1520. The CPU 652 displays the generated graphic element based on the display 656 such that it is superimposed over at least a portion of the primary work area 720. FIG. 21, discussed further below describes a suitable set of operations that may be carried out by the CPU 652 to display the superimposed pop-up graphic element per step 1830.

In general, however, it will be appreciated that the CPU 652 provides different amounts and types of information for a given BUB_OBJ based on the user's profile 1520. For example, in at least some cases, the generated graphic element will include dialog boxes or other interactive elements that allow the user to command a point, such as setting a temperature set point, or turning a light off, or the like. The CPU 652 only includes such elements in the generated pop-up graphic if the user has the authorization level necessary to command such points. The information relating to the user's authorizations and privileges is provided in (or may be derived from information within) the user's profile 1520.

Figure 22:
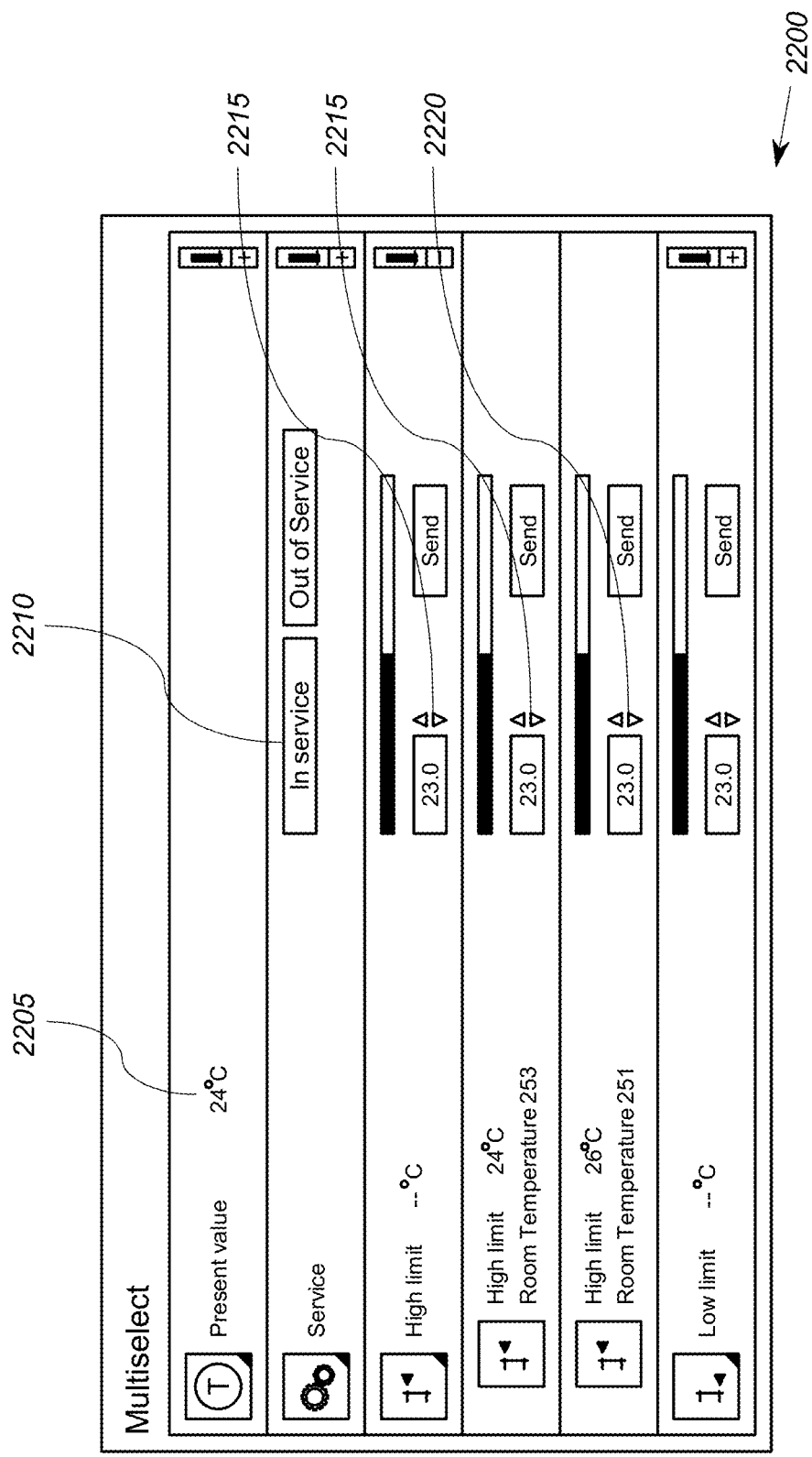
FIG. 22 shows an exemplary graphic element generated by the operations of FIG. 21.

It will be appreciated that FIG. 22 shows a non-limiting example of a pop-up graphic element 2200 that may be generated in step 1830. The CPU 652 would superimpose the graphic element 2200, for example, over a portion of the graphic 2022 of FIG. 20.

After step 1830, the CPU 652 executes step 1835. In step 1835, the CPU 652 determines whether it has received any command value inputs via the generated pop-up display generated in step 1830. As discussed above, at least some of the generated graphics (such as graphic 2200 of FIG. 22) include interactive elements such as dialog boxes, slider controls, button controls or other graphic elements that receive user inputs. If such an input is received via the input device 658, then the CPU 652 proceeds to step 1840. If not, then the CPU 652 proceeds to step 1845.

In step 1840, the CPU 652 causes the received command value to be provided to the database 624$_2$. Thereafter, the CPU 652 executes the server program 624$_1$ to cause the command value to be communicated, in appropriate format, to the device (e.g. devices 602, 604 or 606) via the interface 629 and the network I/O 654 of FIG. 6A. The CPU 652 thereafter proceeds to step 1845.

In step 1845, the CPU 652 determines whether it has received, via the input device 658, an input closing the superimposed graphic element generated in step 1830. If so, then the CPU 652 proceeds to step 1850. If not, then the CPU 652 returns to step 1835.

In step 1850, the CPU 652 refreshes the display 656 (i.e. screen 700 of FIG. 7 or 2000 of FIG. 20) by removing the superimposed graphic element and replacing it with a refreshed versions of the areas of the display 700 over which the graphic element had been superimposed. After step 1850, the CPU 652 has completed the operations of FIG. 18 and returns to step 946 to process other inputs and/or proceed accordingly.

Thus, FIG. 18 illustrates a set of operations that the CPU 652 may use to provide further information regarding an object represented by an icon in the primary work area 720 without selecting the icon as the contextual object (i.e. per step 924). Indeed, the operations of FIGS. 9 and 18 may be used such that additional information regarding two child objects in the primary work area 720 may be simultaneously be displayed. In particular, one child object of the primary work area 720 may be displayed in the contextual work area 725, and additional information regarding a different child object of the primary work area 720 may be simultaneously displayed in the superimposed graphic element generated in step 1820 and/or step 1830.

FIG. 19 shows the operations of the CPU 652 in generating the initial rollover graphic element discussed above in connection with step 1820 of FIG. 18, and illustrated by way of example in FIG. 20 as element 2024. As discussed above in connection with steps 1815 and 1820, the operations of FIG. 19 are initiated when the CPU 652 detects that the cursor (e.g. cursor 2027) has been moved overtop an icon for the object identified as BUB_OBJ.

In step 1905, the CPU 652, upon detection of a input indicating a rollover for the icon associated with BUB_OBJ, retrieves the configuration data for the object data record 1605, 1610 associated with BUB_OBJ, and obtains the value of the function property <function> from the retrieved configuration data. As discussed above, the function library 1535 contains a plurality of functions. The function property <function> of each object data record 1605, 1610 identifies the function or functions from the function library 1535 appropriate for the object data record 1605, 1610. Thus, in the example of FIG. 20, the CPU 652 in step 1905 could identify that function property value for the select object data record (e.g. object data record corresponding to object icon 2023$_3$) is a "temperature sensor" function, similar to the "temperature sensor" function 128$_1$ of FIGS. 1A and 2A, discussed further above. In any event, the CPU 652 thereafter proceeds to step 1910.

In step 1910, the CPU 652 retrieves the identified function definition, and obtains general static properties therefrom. The CPU 652 may also obtain from the function the identification of relevant available variable properties. Thus, in the example of FIG. 20, the CPU 652 would retrieve the function definition for a temperature sensor (see, e.g. function definition 128$_1$ of FIG. 1A), and obtain any static properties such as the identification of an icon (e.g. icon 184 of FIG. 1A), and obtain a list of the other available properties, including those corresponding to active system values such as present value, status, high limit, etc.

In step 1915, the CPU 652 determines, based on the available properties and system values identified in the function in step 1910, and preferably also based on the user profile 1520 of the user, the data required for the object to generate the rollover graphic element (e.g. element 2024). The CPU 652 further determines the required values based on the needs of the rollover graphic operation itself For the rollover graphic operation, the required data/values may suitably include the present value associated with the device, a status value, and an icon representative of BUB_OBJ as defined by its function. In simple cases, the amount and type of data required for the rollover graphic element will not depend on the user profile 1520. However, reference to the user profile 1520 allows for varying the amount of information to be provided based on the user's authorization or privilege level.

In step 1920, the CPU 652 identifies the function mapper of the function mappers 1540 that corresponds to the identified object BUB_OBJ.

Thereafter, in step 1925, the CPU 652 executes a corresponding function mapper 1540 to obtain data relevant to the identified object data record, based on the determined required values of step 1915, from the database 624$_2$. The CPU 652 further employs the function mapper 1540, to the extent necessary, to convert the data to a uniform format defined by the function.

In step 1930, the CPU 652 continues execution the operation to generate the rollover graphic element (e.g. rollover graphic element 2024 of FIG. 20) using the values returned via the function (from functions 1535) and the function mapper (from function mappers 1540).

After step 1930, the operations of FIG. 19 are complete.

As discussed above, FIG. 21 shows in further detail the steps that may be carried out by the CPU 652 in generating a superimposed graphic responsive to appropriate selection of an icon for which a rollover graphic element has been displayed, as per step 1830 of FIG. 18. As discussed above in connection with steps 1825 and 1830, the operations of FIG. 21 are initiated when the CPU 652 detects a secondary selection input action (e.g. "right-click" of mouse) on the input device 658 while the cursor (e.g. cursor 2027) is positioned overtop an icon for the object identified as BUB_OBJ. In this embodiment, the superimposed graphic is displayed using the function library 1535 and function mappers 1540. However, it will be appreciated that in other embodiments, the superimposed graphic element of FIG. 21 may be carried out using data obtained directly from the database 624$_2$ via the corresponding data model.

In step 2105, the CPU 652, upon detection of the secondary input for the icon (or rollover graphic element) associated with BUB_OBJ, retrieves the configuration data for the object data record 1605, 1610 associated with BUB_OBJ, and obtains the value of the function property <function> from the retrieved configuration data. As with step 1905, the CPU 652 in step 2105 could identify that function property value for the select object data record (e.g. object data record corresponding to object icon 2023$_3$) is a "temperature sensor" function, similar to the "temperature sensor" function 128$_1$ of FIGS. 1A and 2A, discussed further above. In any event, the CPU 652 thereafter proceeds to step 2110.

In step 2110, the CPU 652 retrieves the identified function definition, and obtains general static properties therefrom. The CPU 652 may also obtain from the function the identification of relevant available variable properties. Thus, in the example of FIG. 20, the CPU 652 would retrieve the function definition for a temperature sensor (see, e.g. function definition 128$_1$ of FIG. 1A), and obtain any static properties such as the identification of an icon (e.g. icon 184 of FIG. 1A), and obtain a list of the other available properties, including those corresponding to active system values such as present_value, status, high_limit, etc.

In step 2115, the CPU 652 determines, based on the available properties and system values identified in the function in step 2110, and preferably also based on the user profile 1520 of the user, the data required for the object to generate the superimposed graphic element (e.g. element 2200 of FIG. 22, discussed further below). For the superimposed graphic operation in accordance with embodiments described herein, the required data/values may suitably include both present values of measured characteristics (temperature, pressure, light level, flow, etc.) and values of properties may be altered or commanded (status, set points etc.). FIG. 22, for example, shows an exemplary graphic element 2200 that may be generated by the operations of FIG. 21. In the example of FIG. 22, the graphic element includes a present value 2205, a status value 2210, and commandable limits 2215, 2220. Thus, in the example of FIG. 22, the CPU 652 in step 2115 would identify the properties illustrated in FIG. 22 based on the properties available via the temperature sensor function, and based on the user privilege level defined in the user profile 1520.

In step 2120, the CPU 652 the CPU 652 identifies the function mapper of the function mappers 1540 that corresponds to the identified object BUB_OBJ.

Thereafter, in step 2125, the CPU 652 executes a corresponding function mapper 1540 to obtain data required to generate the superimposed graphic element (e.g. element 2200) as determined in step 2115 from the database 624$_2$. The CPU 652 also executes the function mapper 1540, to the extent necessary, to convert the data to a uniform format defined by the function. The converted data is made available via the function to the graphic generation operation of step 2130.

In step 2130, the CPU 652 executes the operation to generate the superimposed graphic element (e.g. graphic element 2200 of FIG. 22) using the values obtained via the function (from the set of functions 1535) and the function mapper (from the set of mappers 1540).

In the specific example of FIG. 22, the graphic element 2200 has been generated for two selected elements, specifically a room temperature data point for each of rooms 251 and 253. In such a case, the user would have used conventional methods to select two icons or selectable values in steps 1805 and/or 1820. As shown in FIG. 22, the displayed properties of the function ("Present value", "Service", "High limit" and "Low limit") may be, on an individual basis, expanded to show the value of each property for each data point. For example, as illustrated in FIG. 22, the "High limit" property is expanded to show the "High limit" property for each underlying data object (Room temperature 251 and Room temperature 253). As also illustrated in FIG. 22 the "Present value", "Service" and "Low limit" properties are collapsed. When collapsed, a value for the property may be displayed if the underlying values of the data points are the same, such as in the case of "Present value" of the example in FIG. 22.

After step 2130, the operations of FIG. 21 are complete.

It will be appreciated that the functions of the function library 1535 can include individual functions that correspond (and/or obtain value through) multiple object data records. For example, a room control function may obtain data through object data records for temperature sensors within the room, a ventilation damper controller within the room, and lighting controls and sensors within the room. In such a case, the function obtains data from the various object data record via individual mappers for each object data record, in order to present a uniform "room control" function data output to any application or operation that calls the function.

It will further be appreciated that the superimposed graphic element 2200 need not necessarily be superimposed over a portion of an existing graphic element (e.g. element 722 of FIG. 7), but rather may constitute an entire window or pane of the screen, such as an entire pane of the screen 700 of FIG. 7. The underlying operations of the CPU 652 in generating the graphic element 2200 remain the same regardless of its placement on the screen 700.

It will be appreciated that the above-described embodiments are merely exemplary, and that those of ordinary skill in the art may readily develop their own implementations and modifications that incorporate the principles of the present invention and fall within the spirit and scope thereof.

What is claimed is:

1. An arrangement for use in a building automation system (BAS), comprising:
   a first BAS device comprising a heating, ventilation and air conditioning (HVAC) device including a temperature sensor;
   a second BAS device comprising a security system including an access control device or a closed-circuit television (CCTV) device;
   a memory storing programming instructions and a plurality of data values including data values corresponding to each of a first object data record having a first format and a second object data record having a second format different from the first format, wherein the first object data record corresponds to the first BAS device, and the second object data record corresponds to the second BAS device,
   a function library including a plurality of function definitions for the first and second BAS devices, each function defining a predetermined set of output values for a corresponding BAS device type, each function of the function library comprising a function data file including at least present value data and status data for the corresponding BAS device type in a uniform format, and wherein a function data file for a temperature sensor includes a name, a list of properties for a temperature sensor that defines a uniform format, an icon and identifier, and a reference to a graphic definition to display a default graphic of a temperature sensor;
   a set of function mappers including a plurality of software functions to convert data accessed via the object data records into a format of data for a corresponding function;
   a display;
   a user input device;
   a processing circuit operably coupled to the memory and the display, the processing circuit configured, when executing the programming instructions, to
   receive additional data values from one or more BAS devices via a network;
   store the additional data values in the memory;
   request within a software operation data pertaining to the first object data record;
   retrieve, from the function library, a stored function appropriate for the first object data record, said function defining a third, uniform data interface format;
   retrieve at least one data value corresponding to the first object data record from the memory;
   identify a particular function mapper within the set of function mappers associated with the first object data record;
   map, by the identified function mapper the at least one data value corresponding to the first object data record to the third format;
   provide the requested data based on the mapped at least one data value to the software operation via the function; and
   execute the software operation to generate at least a portion of a display graphic on the display, the appearance of the portion of the display graphic corresponding at least in part to the mapped at least one data value.

2. The arrangement of claim 1, wherein the processing circuit is further configured, when executing the programming instructions, to
   request within a subsequent software operation data pertaining to the second object data record;
   retrieve at least one data value corresponding to the second object data record from the memory;
   map the at least one data value corresponding to the second object data record to the third format;
   provide to the subsequent software operation the requested data pertaining to the second object data record based on the mapped at least one data value.

3. The arrangement of claim 2, wherein the at least one data value corresponding to the second data object record and the at least one data value corresponding to the first data object record are mapped to a same value of the third format, and wherein the second value and the first value employ a different data format.

4. The arrangement of claim 1, wherein the first BAS device comprising the HVAC device is coupled to communicate at least indirectly with the processing circuit via at least one data network.

5. The arrangement of claim 4, wherein the HVAC device comprises a sensor, and wherein the at least one data value corresponding to the first object data record comprises a first value representative of a temperature sensed by the sensor.

6. The arrangement of claim 5, wherein the second BAS device comprises a second sensor device coupled to communicate at least indirectly with the processing circuit via the at least one data network.

7. The arrangement of claim 6, wherein at least one data value corresponding to the second data object record comprises a second value representative of a temperature sensed by the second sensor device, wherein the second value and the first value employ a different data format.

8. The arrangement of claim 1, wherein the processing circuit is configured, when executing the programming instructions, to request within the software operation the data pertaining to the first object data record by,
   generating a graphic display including a plurality of icons and a movable cursor, wherein a first icon is associated with the first object data record;
   positioning the movable cursor based on user input;
   requesting the data pertaining to the first object data record responsive to location of the movable cursor over the first icon.

9. The arrangement of claim 8, wherein the processing circuit is configured, when executing the programming instructions, to retrieve the stored object type definition that defines a third format, by:
   retrieving an object type identifier from the first object data record; and
   retrieve the stored object type definition defined by the object type identifier.

10. The arrangement of claim 1, wherein the processing circuit is configured, when executing the programming instructions, to request within the software operation the data pertaining to the first object data record by,
    detecting a user input identifying a first icon on the display, the first icon associated with the first object data record;

requesting the data pertaining to the first object data record responsive to detection of the user input.

11. The arrangement of claim 10, wherein the processing circuit is configured, when executing the programming instructions, to execute the software operation to generate the portion of the display by:
generating a display element on the portion of the display, the display element overlaying a portion of an existing graphic on the display.

12. The arrangement of claim 11, wherein the processing circuit is further configured to, when executing the programming instructions,
detect a further user input selecting the display element;
execute the software operation to generate a further display element containing further information related to the first object data record.

13. The arrangement of claim 12, wherein the processing circuit is further configured, when executing the programming instructions, to receive a user input for a first input value via the further display element.

14. The arrangement of claim 13, wherein the processing circuit is further configured to communicate information corresponding to the user input for the first input value to a BAS device.

15. The arrangement of claim 1, wherein
retrieving the at least one data value corresponding to the first object data record from the memory further comprises retrieving at least one data value from each of a plurality of object data records; and
mapping the at least one data value further comprises mapping the at least one data value from the plurality of object data records to the third format.

16. The arrangement of claim 15, wherein the memory further comprises at least one function mapper, the at least one function mapper associating the first object data record with the plurality of object data records.

17. An arrangement for use in a building automation system (BAS), comprising:
a first BAS device comprising a heating, ventilation and air conditioning (HVAC) device including a temperature sensor;
a second BAS device comprising a security system including an access control device or a closed-circuit television (CCTV) device;
a memory storing programming instructions and a plurality of data values including data values corresponding to a first object data record corresponding to the first BAS device, and including data values corresponding to a second object data record corresponding to the second BAS device,
a function library including a plurality of function definitions for the first and second BAS devices, each function defining a predetermined set of output values for a corresponding BAS device type, each function of the function library comprising a function data file including at least present value data and status data for the corresponding BAS device type in a uniform format, and wherein a function data file for a temperature sensor includes a name, a list of properties for a temperature sensor that defines a uniform format, an icon and identifier, and a reference to a graphic definition to display a default graphic of a temperature sensor;
a set of function mappers including a plurality of software functions to convert data accessed via the object data records into a format of data for a corresponding function;
a display;
a user input device;
a processing circuit operably coupled to the memory and the display, the processing circuit configured, when executing the programming instructions, to
receive additional data values from one or more BAS devices via a network;
store the additional data values in the memory;
generate a graphic display including a plurality of icons and an movable cursor, wherein a first icon is associated with the first object data record;
position the movable cursor based on user input;
request within a software operation data pertaining to the first object data record responsive to location of the movable cursor over the first icon;
retrieve, from the function library, a stored function appropriate for the first object data record, said function defining a uniform data interface format;
retrieve from the memory at least one data value pertaining to the first object data record responsive to location of the movable cursor over the first icon;
identify a particular function mapper within the set of function mappers associated with the first object data record;
map, by the identified function mapper, the at least one data value corresponding to the first object data record to the uniform data interface format;
provide the requested data based on the mapped at least one data value to the software operation via the function; and
execute the software operation to modify the graphic display to include a graphic element within the generated graphic display, the appearance of the graphic element corresponding at least in part to the mapped at least one data value.

18. The arrangement of claim 17 wherein the processing circuit is configured, when executing the programming instructions, to
retrieve an object type identifier from the first object data record; and
execute the software operation to modify the graphic display to include the graphic element within the generated graphic display, the appearance of the graphic element defined in part by a format associated with the object type identifier.

19. The arrangement of claim 18, wherein the first BAS device comprising the HVAC device is coupled to communicate at least indirectly with the processing circuit via at least one data network.

20. The arrangement of claim 19, wherein the HVAC device is a sensor, and wherein the at least one data value corresponding to the first object data record comprises a first value representative of a temperature sensed by the sensor.

21. The arrangement of claim 20, wherein the second BAS device comprises a second sensor device coupled to communicate at least indirectly with the processing circuit via at least one data network.

22. The arrangement of claim 17, wherein the processing circuit is further configured to, when executing the programming instructions,
detect a further user input selecting the graphic element;
execute the software operation to generate a further graphic element containing further information related to the first object data record.

23. The arrangement of claim 22, wherein the processing circuit is further configured to, when executing the programming instructions, receive a user input for a command value via the further graphic element.

24. The arrangement of claim 23, wherein the processing circuit is further configured to communicate information corresponding to the user input for the command value to a BAS device.

25. The arrangement of claim 22, wherein the further graphic element includes interactive elements for receiving user inputs related to the first BAS device.

26. The arrangement of claim 25, wherein processing circuit is further configured to, when executing the programming instructions, receive a command value through at least a first of the interactive elements.

27. The arrangement of claim 26, wherein the processing circuit is further configured to, when executing the programming instructions, communicate the command value to a BAS device.

28. The arrangement of claim 26, wherein the processing circuit is further configured to, when executing the programming instructions,
   store the command value in a database; and
   execute further program instructions to communicate the command value from the database to a BAS device via the network.

29. A method for use in a building automation system (BAS), comprising:
   providing a first BAS device comprising a heating, ventilation and air conditioning (HVAC) device including a temperature sensor;
   providing a second BAS device comprising a security system including an access control device or a closed-circuit television (CCTV) device;
   storing in a memory a plurality of data values including data values corresponding to each of a first object data record having a first format and a second object data record having a second format different from the first format, wherein the first object data record corresponds to the first BAS device, and the second object data record corresponds to the second BAS device;
   providing a function library including a plurality of function definitions for the first and second BAS devices, each function defining a predetermined set of output values for a corresponding BAS device type, each function of the function library comprising a function data file including at least present value data and status data for the corresponding BAS device type in a uniform format, and wherein a function data file for a temperature sensor includes a name, a list of properties for a temperature sensor that defines a uniform format, an icon and identifier, and a reference to a graphic definition to display a default graphic of a temperature sensor;
   providing a set of function mappers including a plurality of software functions to convert data accessed via the object data records into a format of data for a corresponding function;
   receiving additional data values from one or more BAS devices via a network;
   storing the additional data values in the memory;
   requesting within a software operation data pertaining to the first object data record;
   retrieving, from the function library, a stored function appropriate for the first object data record, said function defining a third uniform data interface format;
   retrieving at least one data value corresponding to the first object data record from the memory;
   identifying a particular function mapper within the set of function mappers associated with the first object data record;
   mapping, by the identified function mapper, the at least one data value corresponding to the first object data record to the third format;
   providing the requested data based on the mapped at least one data value to the software operation via the function; and
   executing the software operation using a processor to generate at least a portion of a display graphic on a display, the appearance of the portion of the display graphic corresponding at least in part to the mapped at least one data value.

30. The method of claim 29, further comprising:
   requesting within a subsequent software operation data pertaining to the second object data record;
   retrieving at least one data value corresponding to the second object data record from the memory;
   mapping the at least one data value corresponding to the second object data record to the third format;
   providing to the subsequent software operation the requested data pertaining to the second object data record based on the mapped at least one data value.

31. The method of claim 30, wherein the at least one data value corresponding to the second data object record and the at least one data value corresponding to the first data object record are mapped to a same value of the third format, and wherein the second value and the first value employ a different data format.

* * * * *